(12) United States Patent
Netzer et al.

(10) Patent No.: US 8,052,233 B2
(45) Date of Patent: Nov. 8, 2011

(54) FURNITURE ITEM HAVING A FURNITURE BODY

(75) Inventors: Emanuel Netzer, Höchst (AT); Ingo Gasser, Höchst (AT); Markus Bodingbauer, Höchst (AT)

(73) Assignee: Julius Blum GmbH, Hochst (AT)

( * ) Notice: Subject to any disclaimer, the term of this patent is extended or adjusted under 35 U.S.C. 154(b) by 681 days.

(21) Appl. No.: 11/892,888

(22) Filed: Aug. 28, 2007

(65) Prior Publication Data

US 2008/0265729 A1 Oct. 30, 2008

(30) Foreign Application Priority Data

Apr. 30, 2007 (AT) .................................. GM269/2007

(51) Int. Cl.
*A47B 95/00* (2006.01)
(52) U.S. Cl. ..................... 312/330.1; 312/319.1; 16/85
(58) Field of Classification Search ............ 312/330.1, 312/333, 334.44, 334.46, 319.1–319.2; 49/9; 16/85, 86 R
See application file for complete search history.

(56) References Cited

U.S. PATENT DOCUMENTS

| | | | | |
|---|---|---|---|---|
| 2,074,008 A | * | 3/1937 | Wolf | 16/85 |
| 3,909,877 A | * | 10/1975 | Christy et al. | 16/85 |
| 4,030,715 A | * | 6/1977 | Duran | 267/64.11 |
| 4,601,502 A | * | 7/1986 | Van Dyke | 16/82 |
| 5,517,719 A | * | 5/1996 | Christ | 16/85 |
| 6,553,617 B1 | * | 4/2003 | Salice | 16/85 |
| 6,615,450 B2 | * | 9/2003 | Salice | 16/85 |
| 7,032,271 B2 | * | 4/2006 | Lin | 16/85 |
| 7,234,569 B2 | * | 6/2007 | Salice | 16/85 |
| 7,645,002 B2 | * | 1/2010 | Fitz | 312/215 |
| 7,657,970 B2 | * | 2/2010 | Artsiely | 16/85 |
| 2004/0100169 A1 | * | 5/2004 | Huber et al. | 312/319.5 |

FOREIGN PATENT DOCUMENTS

| | | |
|---|---|---|
| EP | 0 421 458 | 4/1991 |
| EP | 1162338 | * 12/2001 |
| GB | 283826 | * 1/1928 |

* cited by examiner

*Primary Examiner* — Hanh V Tran
(74) *Attorney, Agent, or Firm* — Wenderoth, Lind & Ponack, L.L.P.

(57) ABSTRACT

A spring buffer for a furniture item has a furniture body and a furniture part movable from a closed position in or on the furniture body. The spring buffer can be arranged relative to the furniture body and the furniture part such that the movable furniture part in its closed end position can be moved against the force of the spring buffer towards the direction of the furniture body. The spring buffer includes a buffer element for the movable furniture part and the buffer element is acted upon by a spring. The buffer element is movably arranged such that the distance covered by the buffer element against the force of the spring can be changeably adjusted.

13 Claims, 20 Drawing Sheets

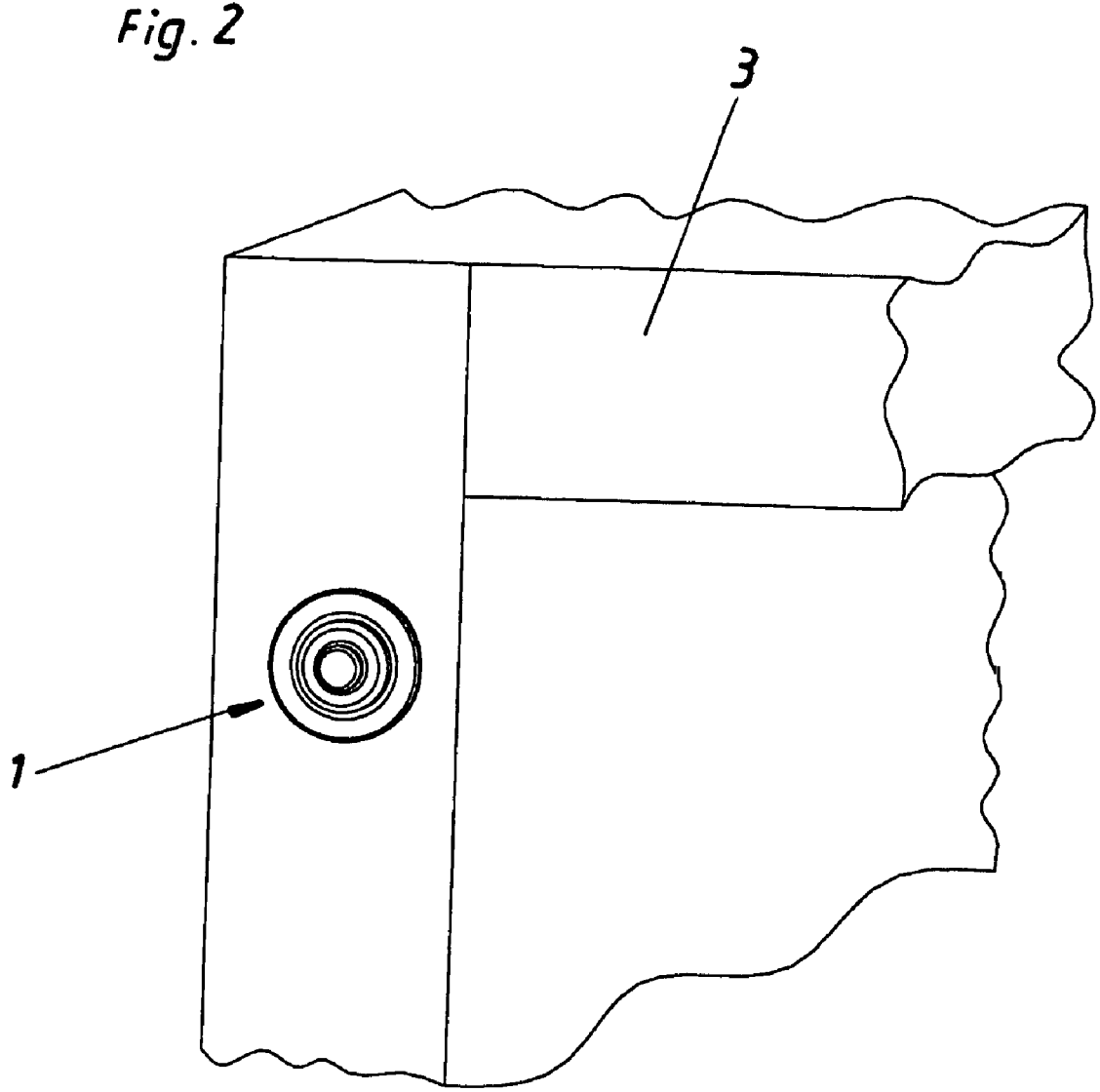

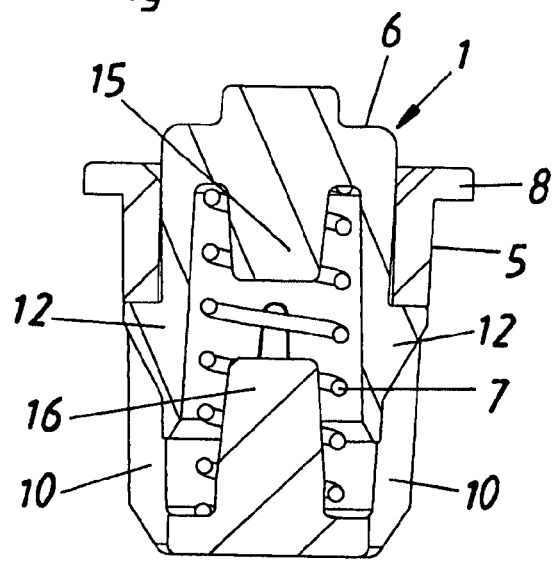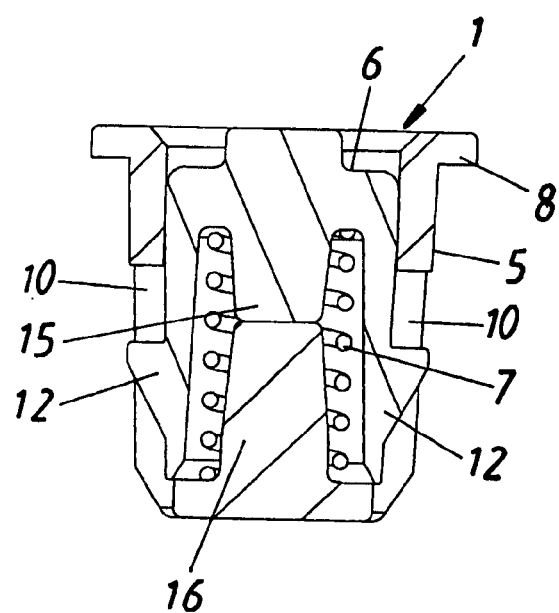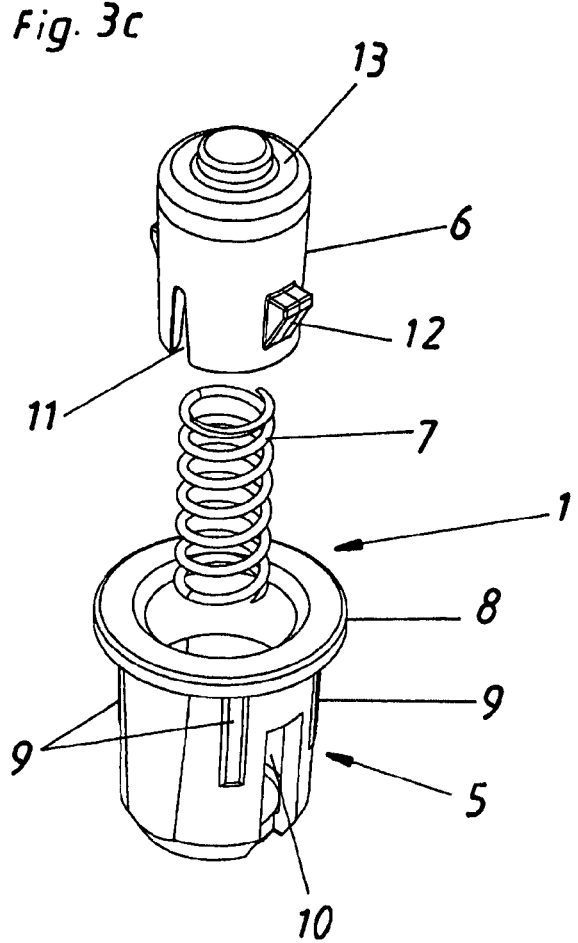

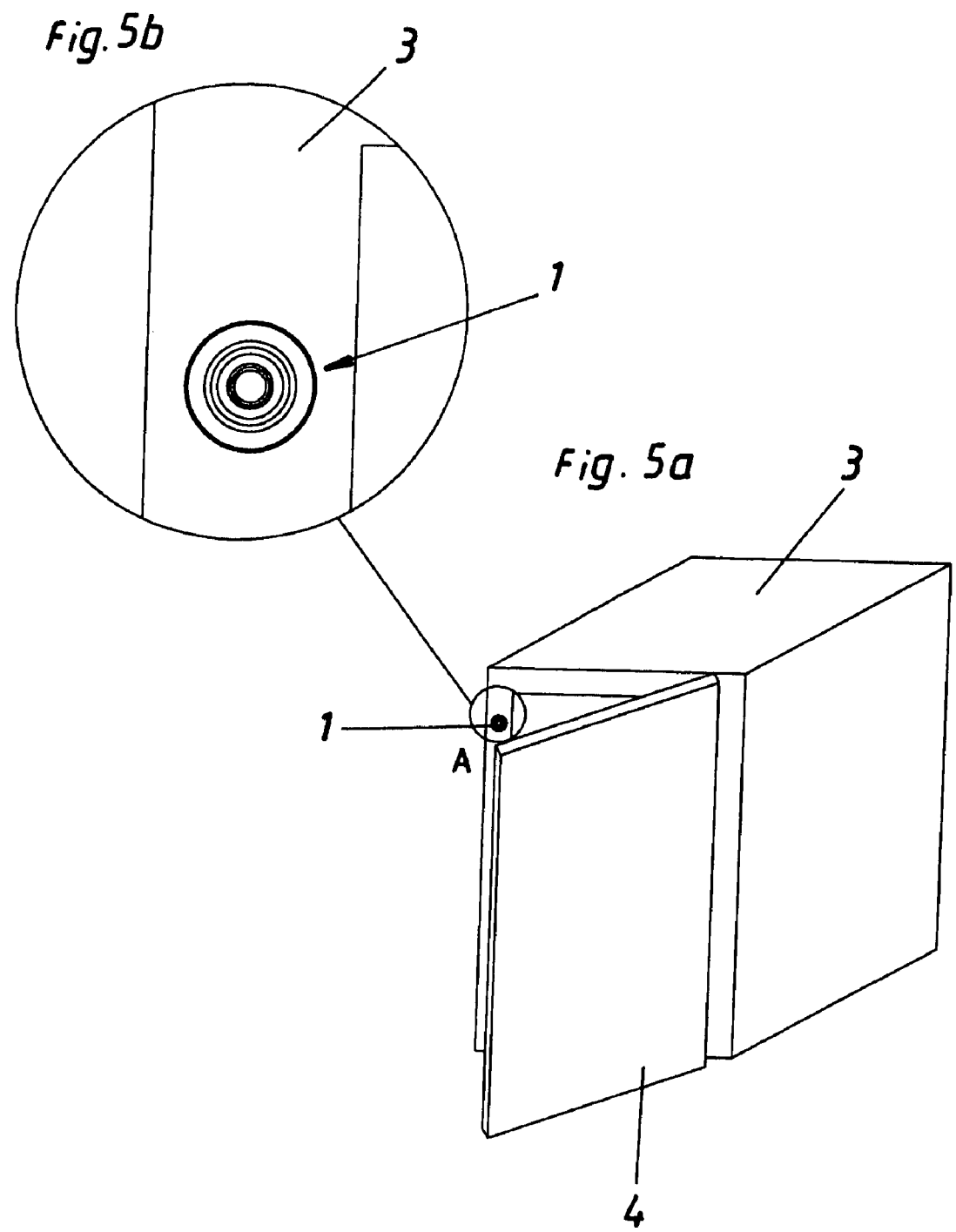

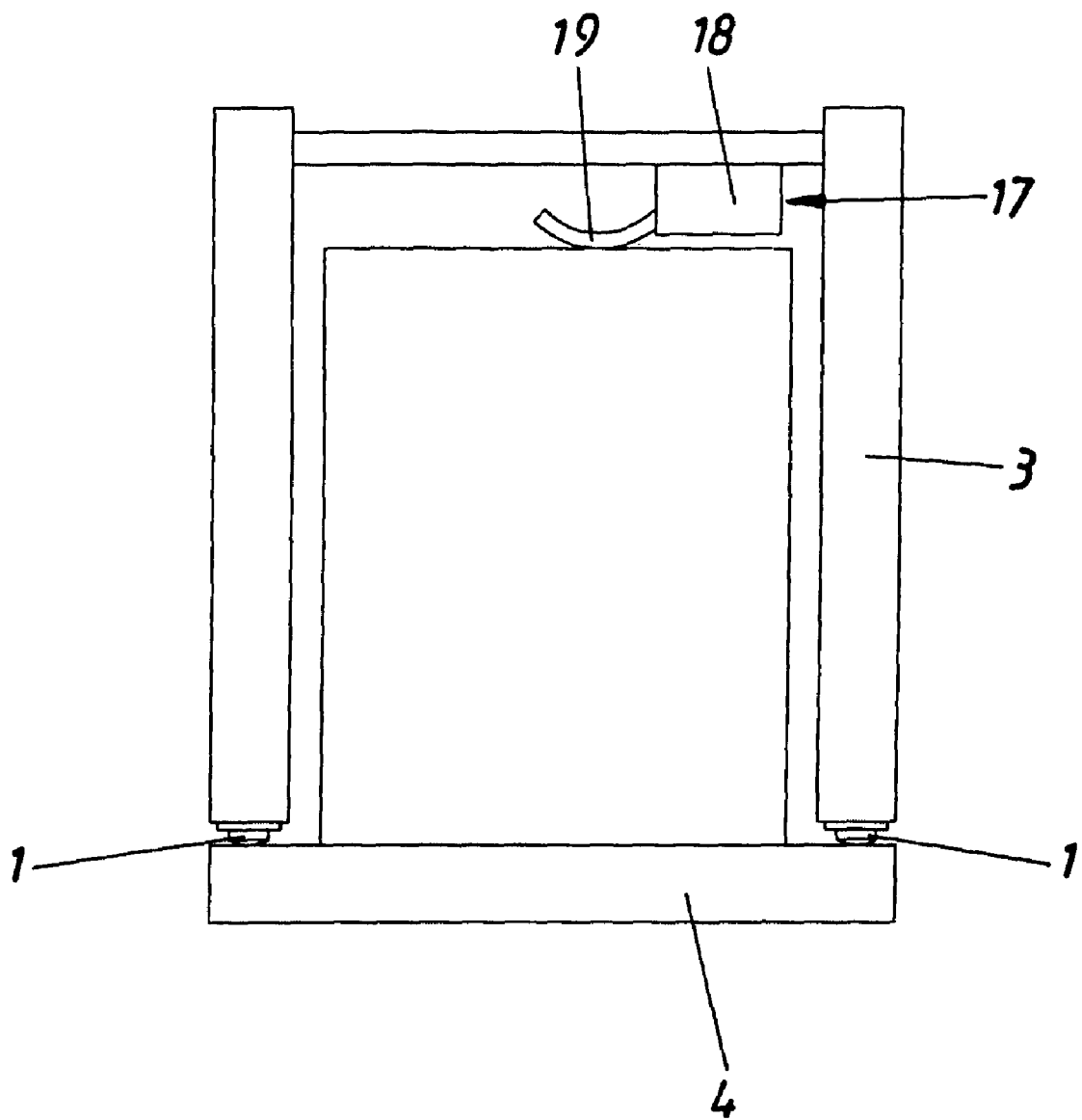

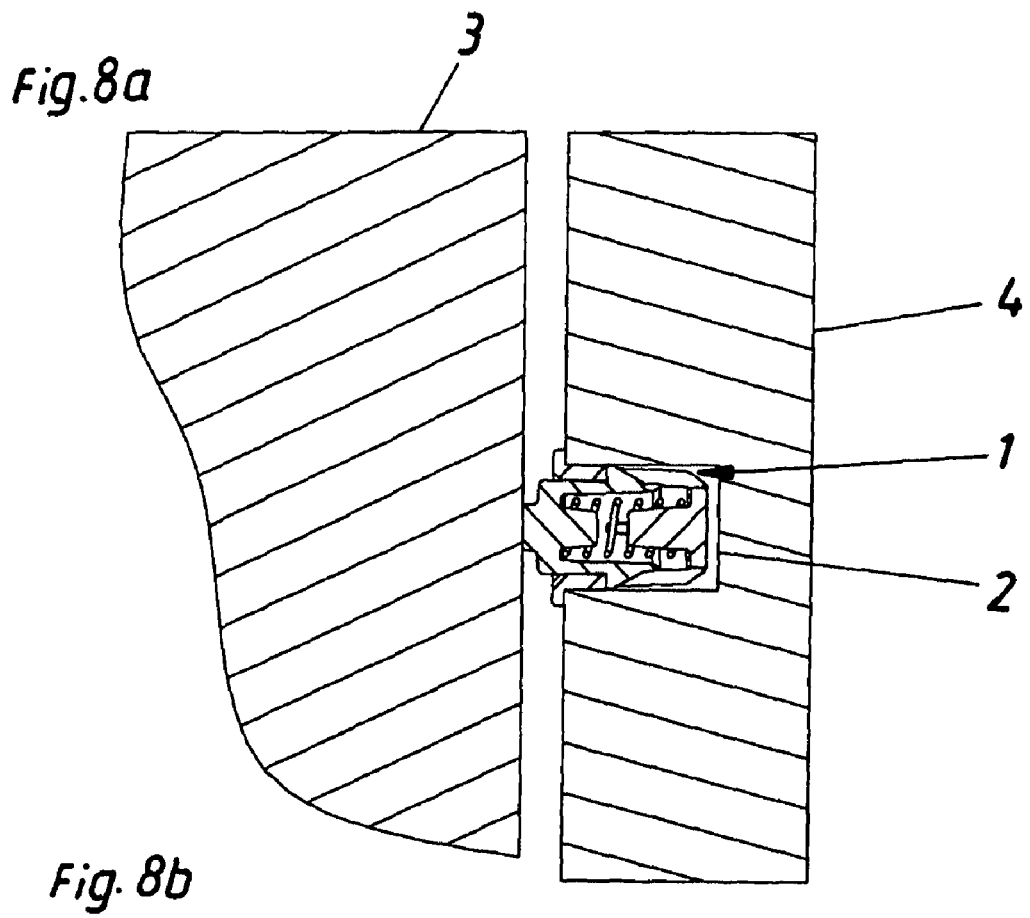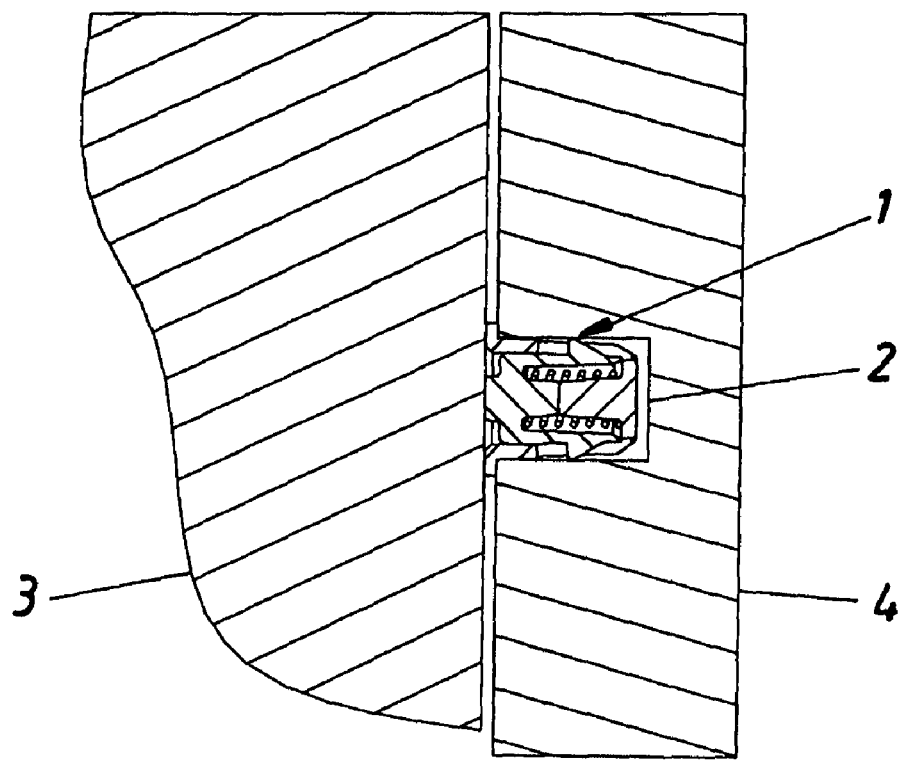

FURNITURE ITEM HAVING A FURNITURE BODY

BACKGROUND OF THE INVENTION

The present invention relates to a furniture item having a furniture body and a furniture part being movable from a closed end position in or on the furniture body.

To make them easier to use, furniture items are frequently provided with ejection devices by means of which the movable furniture part can be ejected from a closed end position in or on the furniture body. Particularly in the case of movable furniture parts with no handles, the ejection devices are often arranged such that they are triggered (activated) by the movement of the movable furniture part from the closed stop position towards the furniture body (i.e., movement in a non-opening direction toward a triggering, or activating, position). This naturally requires a certain amount of play (activating distance) to be left for the movable furniture part in its closed end position.

The problem arising from this is that, when assembling the furniture item, on the one hand allowance must be made for the movement of the movable furniture part from the closed stop position towards the furniture body. On the other hand, particularly in the case of a furniture item with several movable furniture parts, or where several furniture items are placed side by side, the frontal surface must be uniform. This makes it more difficult to assemble this type of furniture, and can even limit the suitability of such furniture from incorporating an ejection device of the type described above.

It is an object of the invention to improve a generic furniture item avoiding these problems.

SUMMARY OF THE INVENTION

This object is resolved by a furniture item having the features described below.

The provision of a spring buffer on the one hand guarantees that there is always sufficient play (sufficient activating distance) between the furniture body and the movable furniture part in its closed end position. On the other hand, by using the same type of spring buffer for furniture items with several movable furniture parts or different furniture items, this ensures that all movable furniture parts have the same amount of play, thus providing a uniform frontal surface.

Examples of movable furniture parts within the meaning of this disclosure include drawers, lids and furniture doors.

The spring buffer(s) can be arranged on the furniture body or on the furniture part such as in a bored hole.

In the case where the movable furniture part is a drawer, it can be provided, for example, that the spring buffer is arranged on the furniture body in such a way that, in its closed position, the drawer can rest with the front panel in contact with the spring buffer.

In the case where the movable furniture part is a furniture door, it can be provided, for example, that the spring buffer is arranged on the furniture body in such a way that, in its closed position, the furniture door can rest with its panel in contact with the spring buffer. A lid can rest with its panel in contact with the spring buffer in just the same way.

In both cases, easy access to the spring buffer is provided in the assembled furniture item. Furthermore, it is simple to retrofit spring buffers according to the invention to existing furniture items.

A further design version of the invention concerns a furniture item which is arranged such that the movable furniture part is an inner drawer which is mounted on a drawer guide assembly on the furniture body and that the spring buffer is arranged on this drawer guide. The drawer guide comprises a body rail to be attached to the furniture body and a drawer rail to be attached to the movable furniture part.

A spring buffer for a furniture item according to the invention can comprise, for example, a buffer element, acted on by a spring, for the movable furniture part. Although other designs are possible, provision can be made that the buffer element is movable and located in a pot. In this case, it can be provided that at least a projection is arranged on the buffer element which engages in a groove of the pot such that movement of the buffer element relative to the pot is provided by the ability of the projection to move in the groove.

In each case, it is beneficial to arrange protrusions corresponding with each other which are formed both on the buffer element as well as on the pot which restrict the movement of the buffer element in the pot. Since the buffer element is often formed in the shape of a thin-walled cylinder, it can be deformed if the force used to move the movable furniture part is too strong when transferred to the spring buffer. This is prevented by providing the protrusions.

A preferred design provides that the spring buffer is formed such that the distance covered by the buffer element against the pressure exerted by the spring (i.e., the activating distance) can be changed by adjustment. This can allow the residual play between the movable furniture part in its closed position and the furniture body to be selected either at the factory or subsequently. This also provides a means of overcoming any remaining differences in the frontal surface in furniture with several movable furniture parts or where several furniture items are arranged together.

A spring buffer of this type can be designed, for example, such that the buffer element is housed in a sleeve, wherein the sleeve is arranged in the pot pot. Screw threads are formed on the sleeve and the pot such that the position of the sleeve in the pot can be changed by rotating the sleeve.

If provision is made to include a slot on the sleeve into which an adjusting device can be inserted, preferably a screwdriver, the adjustment of the spring buffer is made easier thereby.

A beneficial variant of the invention provides that the spring buffer comprises a housing formed in such a way that it can be placed into the drawer rail of the drawer guide. This forms a particularly compact construction.

The spring buffer can be formed, for example, such that it comprises a slide against which a spring presses. Preferably, a stop is arranged on the body rail of the drawer guide for this slide. The spring pressing on the slide can be a curved spring for preference. According to one design version of the invention, it can be arranged that an adjusting device is provided by means of which the relative position between the housing and the slide can be adjusted.

A further practical variant provides that the movable furniture part is a drawer, whereby the drawer is releaseably connectable via a coupling device to a drawer guide arranged on the furniture item. The drawer guide comprises at least one drawer rail which is movable relative to the body rail, and a spring buffer forms a part of the coupling device. The basic idea of a releasable connection between a drawer and a drawer guide assembly is already known in the state of the art in the form of many different designs. Reference is made to the applicant's European patent document EP 0 421 458 B1, which describes a possible example of a design for a coupling of this type between a drawer and a drawer guide.

Although the invention is particularly suitable for movable furniture parts without handles, it is not restricted just to these items. The use of the invention for movable furniture parts with handles is also included in the protection scope of the present application.

The common element in all of the design examples is that an adjusting device can be arranged with the spring buffer in each case, making it possible to adjust the relative position of the buffer element relative to the base unit or, as the case may be, the housing of the spring buffer so that the residual play between the movable furniture part in its closed end position and the furniture body is adjustable. In this arrangement, the adjusting device can include an actuating element, adjustable manually or by means of a tool, so that the travel distance of the movable furniture part to trigger a touch latch function and/or the frontal surface of the movable furniture part in relation to adjacent furniture parts is adjustable.

BRIEF DESCRIPTION OF THE DRAWINGS

Further advantages and details of the invention are illustrated using the following figures and the descriptions referring to them.

They illustrate.

DETAILED DESCRIPTION OF THE INVENTION

Figure 1A:
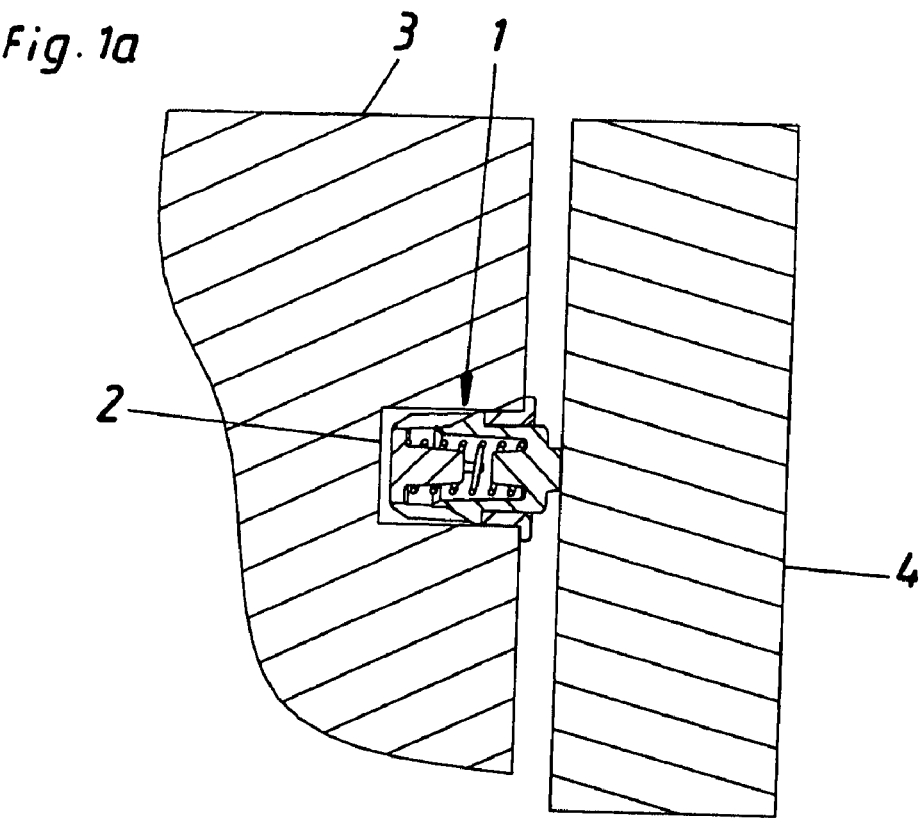
FIG. 1a, 1b A section through a first design example of a furniture item according to the invention, FIG. 2 A partial perspective view of the furniture item illustrated in FIG. 1, FIG. 3a, 3b, 3c Sections and an exploded view of a spring buffer according to the invention, FIG. 4a, 4b, 4c Sections and an exploded view of a further example of a spring buffer according to the invention, FIG. 5a, 5b A perspective view of an example of a furniture item according to the invention and a detailed view of it, FIG. 6a, 6b A perspective view of a further example of a furniture item according to the invention and a detailed view of it, FIG. 7 A diagrammatic internal view of the furniture item in FIGS. 6a, 6b, FIG. 8a, 8b Sections through a further example of a furniture item according to the invention, FIG. 9 A partial perspective view of further example of a furniture item according to the invention, FIG. 10 A further partial perspective view of the example shown in FIG. 9, FIG. 11a, 11b, 11c Perspective views of a further example of a spring buffer according to the invention, FIG. 12a, 12b A perspective view of a further example of a furniture item according to the invention and a detailed view of it, FIG. 13 A perspective view of a the front section of a drawer slide with an incorporated and adjustable spring buffer, FIGS. 14a to 14c Different views of the example of a spring buffer illustrated in FIG. 13, FIGS. 15a to 15c Different positions of the spring buffer incorporated into the drawer rail, FIG. 16a, 16b The spring buffer in the assembled condition and in an exploded view, FIG. 17 A cabinet with a movable furniture part designed as an inner drawer, FIGS. 18a to 18d Different views of a releasable coupling device to connect the drawer with a drawer guide, in which the coupling device comprises a spring buffer, FIG. 19a, 19b Top views of the coupling devices in two different positions of the buffer element, FIG. 20a, 20b A view of the underside of the drawer with the latched coupling device and an enlarged detailed view of it.

FIG. 1a shows a section through a furniture item with a furniture body 3 and a movable furniture part 4 whereby the movable furniture part 4 is located in its closed position in the situation illustrated in FIG. 1a. A spring buffer 1 according to the invention is inserted in hole 2 in the furniture body 3. The gap between the furniture body 3 and the movable furniture part 4, brought about by the spring buffer 1 and with its dimension uniquely defined, is clearly recognizable. This gap ensures that there is adequate play for the movable furniture part 4 in its closed end position shown in FIG. 1, allowing it to move in the direction of the furniture body 3.

Figure 1B:
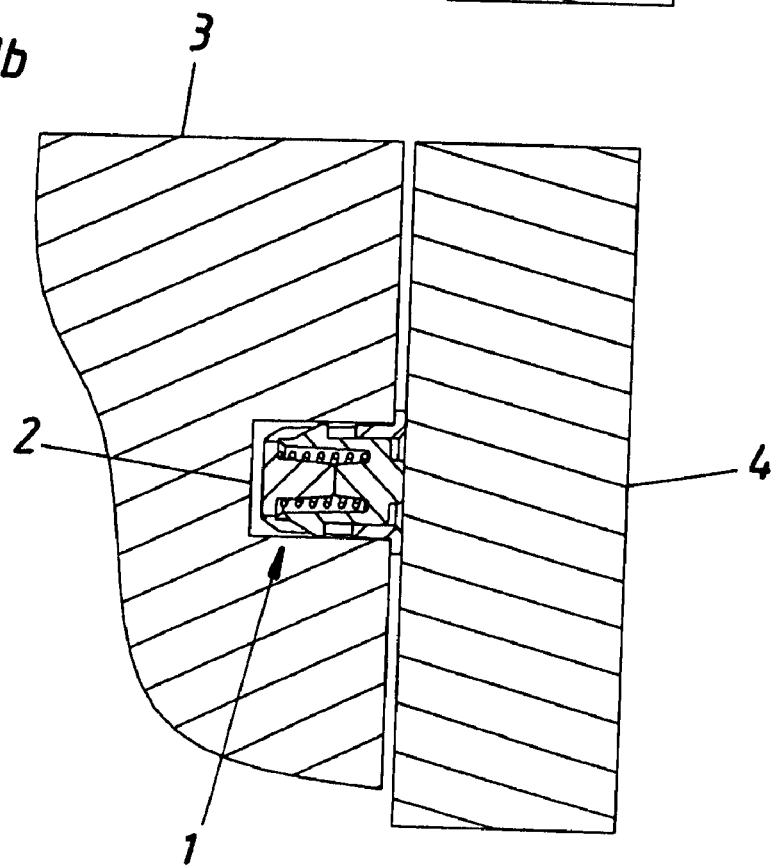

The situation in FIG. 1b is shown for the arrangements illustrated in FIG. 1a, after the movable furniture part 4 has been moved by a user—not shown—from its closed end position towards the furniture body 3.

FIG. 2 shows, in a diagrammatic partial view, how the spring buffer 1 appears to a user when the movable furniture part 4 is removed from the furniture body 3 (not shown in FIG. 2).

One example for a possible design of the spring buffer 1 is illustrated in FIGS. 3a-c. FIG. 3a shows the spring buffer 1 in a position corresponding to FIG. 1. The fully compressed condition of the spring buffer 1 which corresponds to FIG. 1b is shown in FIG. 3b. FIG. 3c shows an exploded view.

The configuration of the buffer element 6 in a pot 5 selected for this design example, shows a coil spring 7 arranged between the buffer element 6 and the pot 5. To make assembly of the buffer element 6 into the pot 5 easier, the buffer element 6 is provided with two slots 11, one of which can be seen in FIG. 3c. The slots 11 make it easier to squeeze the buffer element 6 radially inwards and then to insert the buffer element 6 into the pot 5. In this example, the buffer element 6 is provided with a rubber cap 13.

It can also be seen, particularly in FIGS. 3a and 3b, that the extent to which the buffer element 6 projects out of the pot 5 is limited by the stops 12 which can move in slot 10.

To improve the stability, protrusions 15, 16 are provided which restrict the movement of the buffer element 6 into the pot 5, as shown in FIG. 3b.

Figure 4A:
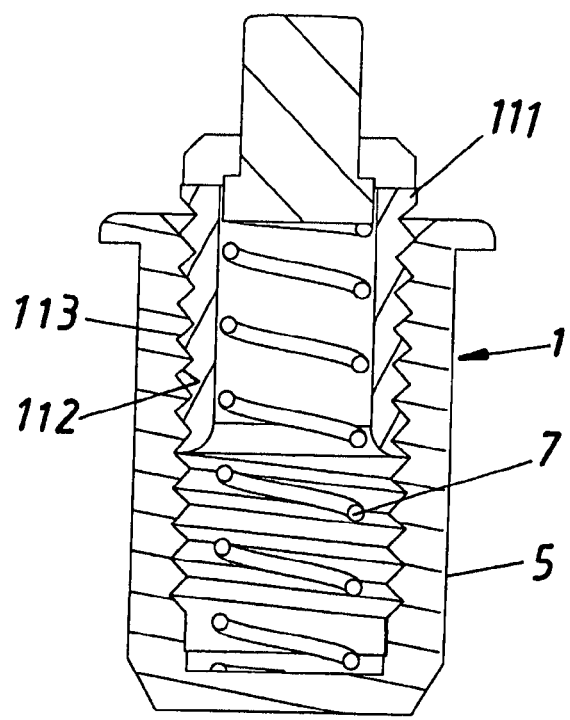
Figure 4B:
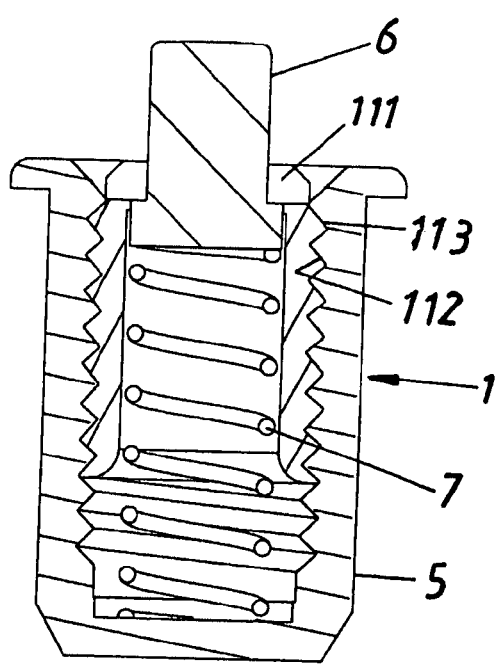
Figure 4C:
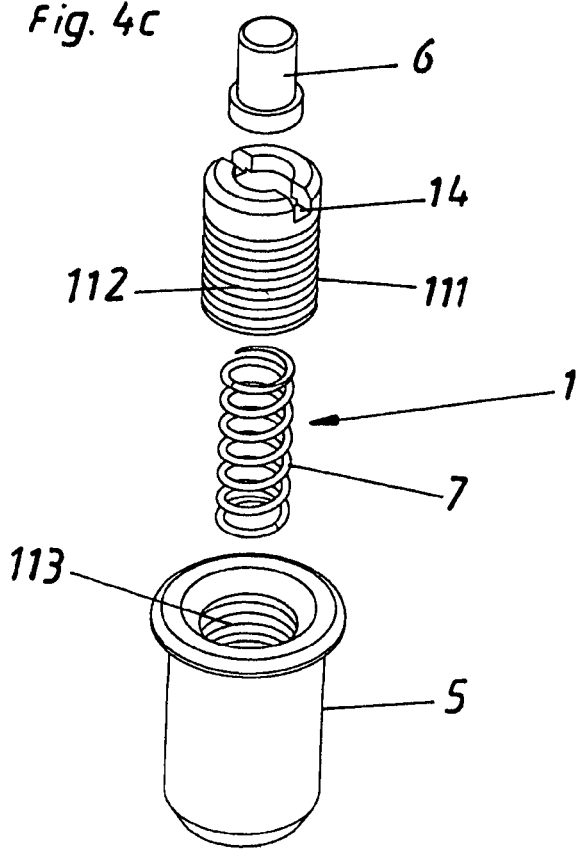

To improve the fastening of the spring buffer 1 in a hole 2 (shown as examples in FIGS. 1a and 1b), several ribs 9 are formed on the pot 5. The example shown in FIGS. 4a-c differs from the example illustrated in FIGS. 3a-3c in that the amount by which the buffer element 6 projects out of pot 5 (i.e., the position of the buffer element 6) can be adjusted. As illustrated in a comparison of FIGS. 4a and 4b, the adjustment in the position of the buffer element 6 results in an adjustment in the maximum length of coil spring 7. This adjustment requires that the buffer element 6 is movably arranged in a sleeve 111. The sleeve 111 fits in the pot 5 and is adjustable. This is achieved with screw threads 112, 113 in this example. In particular, threads 112 are formed on the outer surface of the sleeve 111, and threads 113 are formed on the inner surface of the pot 5. The entire length of sleeve 111 has an average outer diameter no greater than an average inner diameter of the pot 5 to allow adjustment of sleeve 111 relative to pot 5, as shown in FIGS. 4a-4c. By turning the sleeve 111 in the pot 5, the size of the residual space in the closed position between the movable furniture part 4 and the furniture body 3 can be selected.

As shown in FIG. 4c, the adjustment can be simplified by providing a slot 14 for an adjusting device. In the case shown, this takes the form of a slot for a flat screwdriver. Equally, a cross recess for a Phillips screwdriver or a corresponding recess for a screwdriver or key with a polygonal head could be provided.

FIG. 5a shows a furniture item with a furniture body 3 and a movable furniture part in the shape of a furniture door 4. In this case, a spring buffer 1 according to the invention is arranged on the front side of the furniture body 3. If the spring buffer 1 (as, for example, in FIGS. 4a-c) is made to be adjustable, this arrangement provides easy access to make adjustments. FIG. 5b shows a detailed view.

Figure 6B:
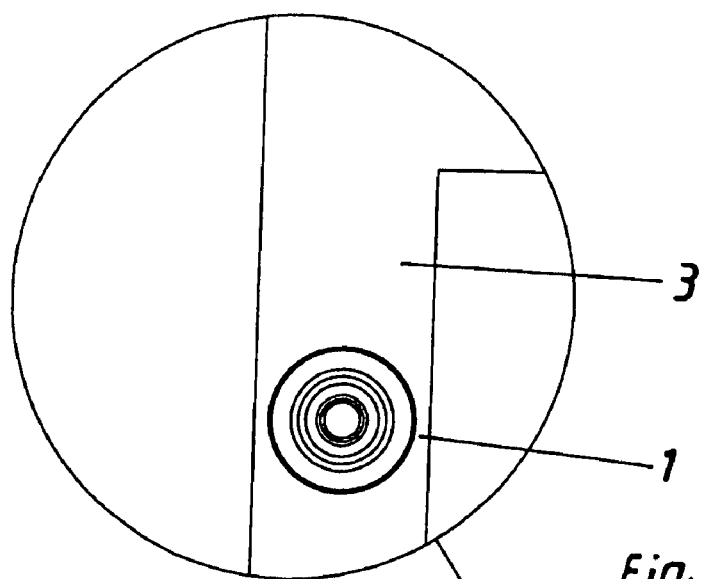
Figure 6A:
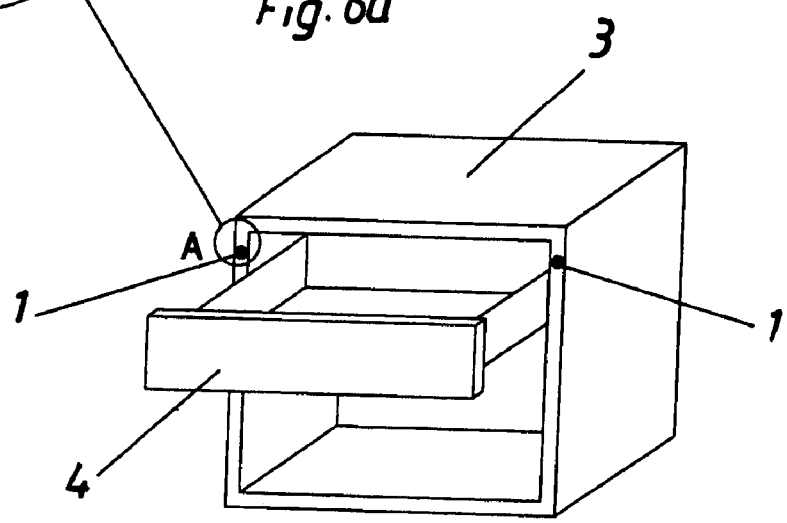

FIG. 6a shows a furniture item in which the movable furniture part is in the shape of a drawer. In this example, two spring buffers 1 according to the invention are arranged on the front side of the furniture body 3. This represents a preferred version. The arrangement of a single spring buffer 1 would also be sufficient in this case. It can be seen that, in its closed position, the front panel of the drawer would rest on the spring buffers 1.

FIG. 7 shows, in diagrammatic form, an internal view of the furniture item according to FIGS. 6a and 6b. The ejection device 17 is seen to be arranged on the rear wall of the furniture body 3. The ejection device 17 consists of a mechanical or electrical actuator 18 for the ejection lever 19 which forces the movable furniture part 4 out.

The ejection device 17 works on the touch latch principle: when the movable furniture part 4 is pressed towards the rear wall of the furniture body 3, the ejection device 17 is triggered. The amount by which the movable furniture part 4 can be pressed in depends on the spring buffer, which can be seen from FIG. 7. An ejection device 17 of this type can be provided for each example.

A further example of a furniture item according to the invention is shown in FIGS. 8a and 8b. A spring buffer 1 of the type described in FIGS. 3a-c is arranged in a hole 2. In the example shown, the spring buffer 1 is not arranged on the furniture body 3, but on the movable furniture part 4. The hole 2 can be, for example, arranged in the front panel of a movable furniture part 4 in the form of a drawer, or in the door panel of a movable furniture part 4 in the form of a door.

Figure 9:
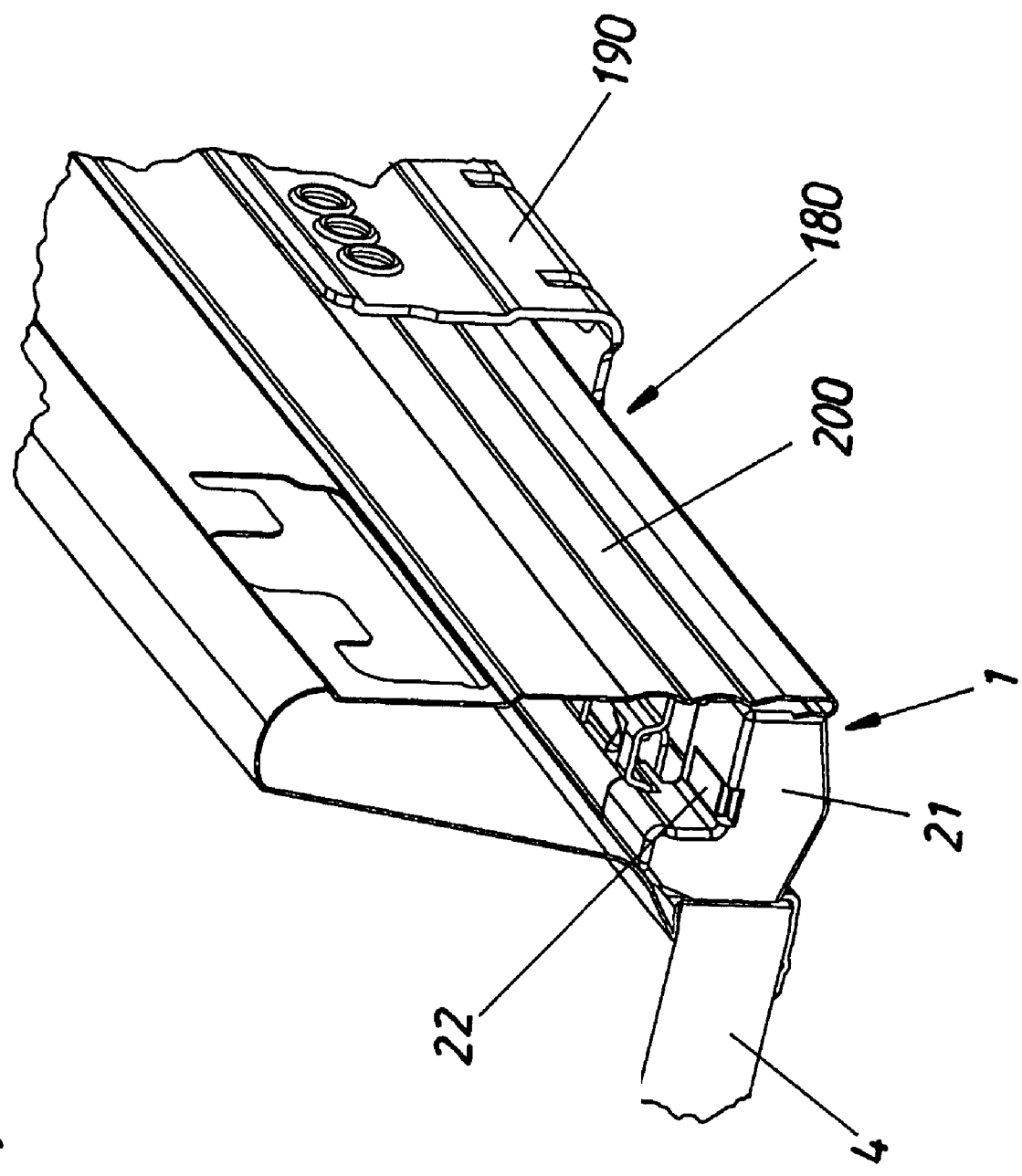

FIG. 9 shows a partial perspective view of a movable furniture part 4 in the form of an inner drawer with a drawer guide 180. To improve the clarity of the illustration, the furniture body 3 is not shown in this case. The drawer guide 180 comprises a body rail 190 adapted to be mounted to the furniture body 3 and a drawer rail 200 which is displaceable relative thereto. In the example shown, the spring buffer 1 consists of a housing 21 which is inserted into the drawer rail 200. The slide 22 can be noted.

Figure 10:
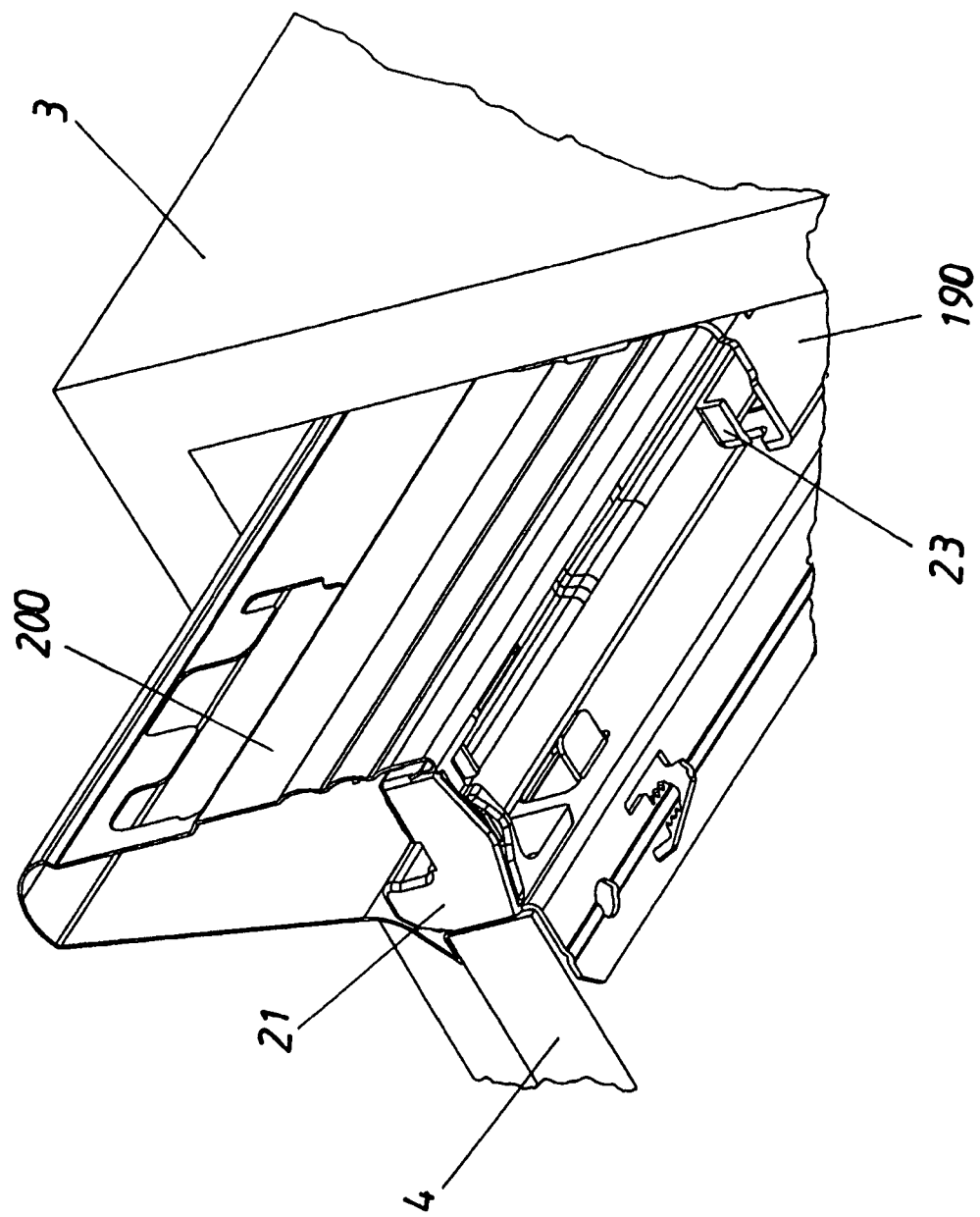

FIG. 10 shows the example from FIG. 9 viewed from underneath the movable furniture part 4, whereby, in FIG. 10, the furniture body 3 is partly visible. Moreover, it can be noticed in FIG. 10 that a stop 23 is formed on the body rail 190. This stop 23 interacts with a projection 24 (see FIG. 11b) formed on the slide 22, such that the slide 22 rests on stop 23 when the inner drawer is at the closed end position in the furniture body 3. If, now, the inner drawer is pressed by the user in the direction of the furniture body 3, the housing 21 firmly connected to the drawer rail 200 moves towards the rear wall of the furniture body 3 relative to the slide 22 resting on the stop 23. By means of this, adequate play is secured in the closed end position of the inner drawer.

The description of the spring buffer 1 continues in more detail in FIGS. 11a-c. FIG. 11a shows the movable position of the slide 22 in the housing 21. In FIG. 11b, the slide 22 has been removed from its location in the housing 21 to reveal the projection 24 formed on the slide 22. Furthermore, the curved spring 25 which acts upon the slide 22 has also been removed from the housing 21. FIG. 11c shows the view from below of the spring buffer 1 illustrated in FIGS. 11a and 11b. The location 26 for the curved spring 25 can be seen. Comparing this image with 11b, the curved spring 25 must be turned through 180° to insert it into the final position 26.

Figure 11:
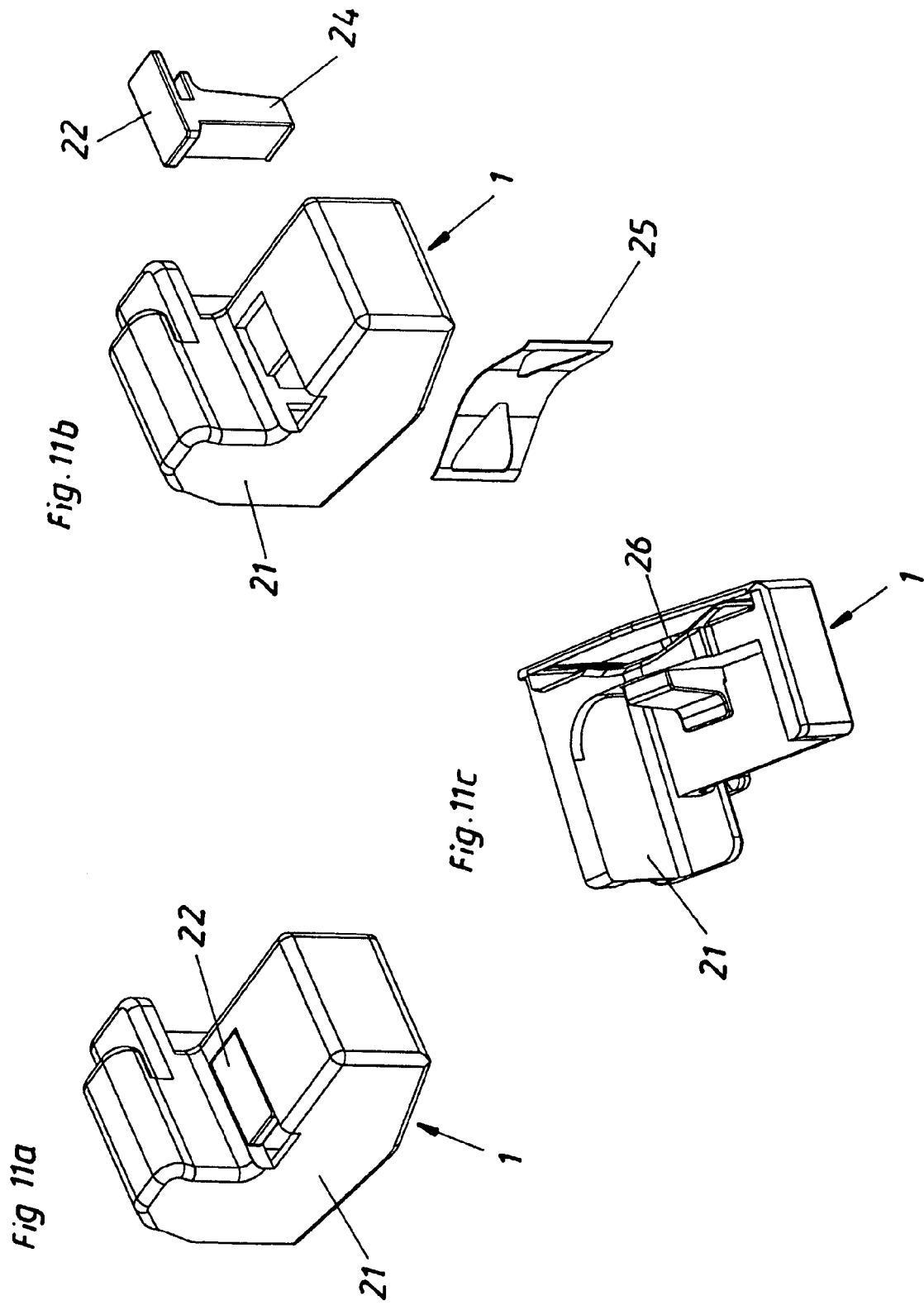
Figure 12:
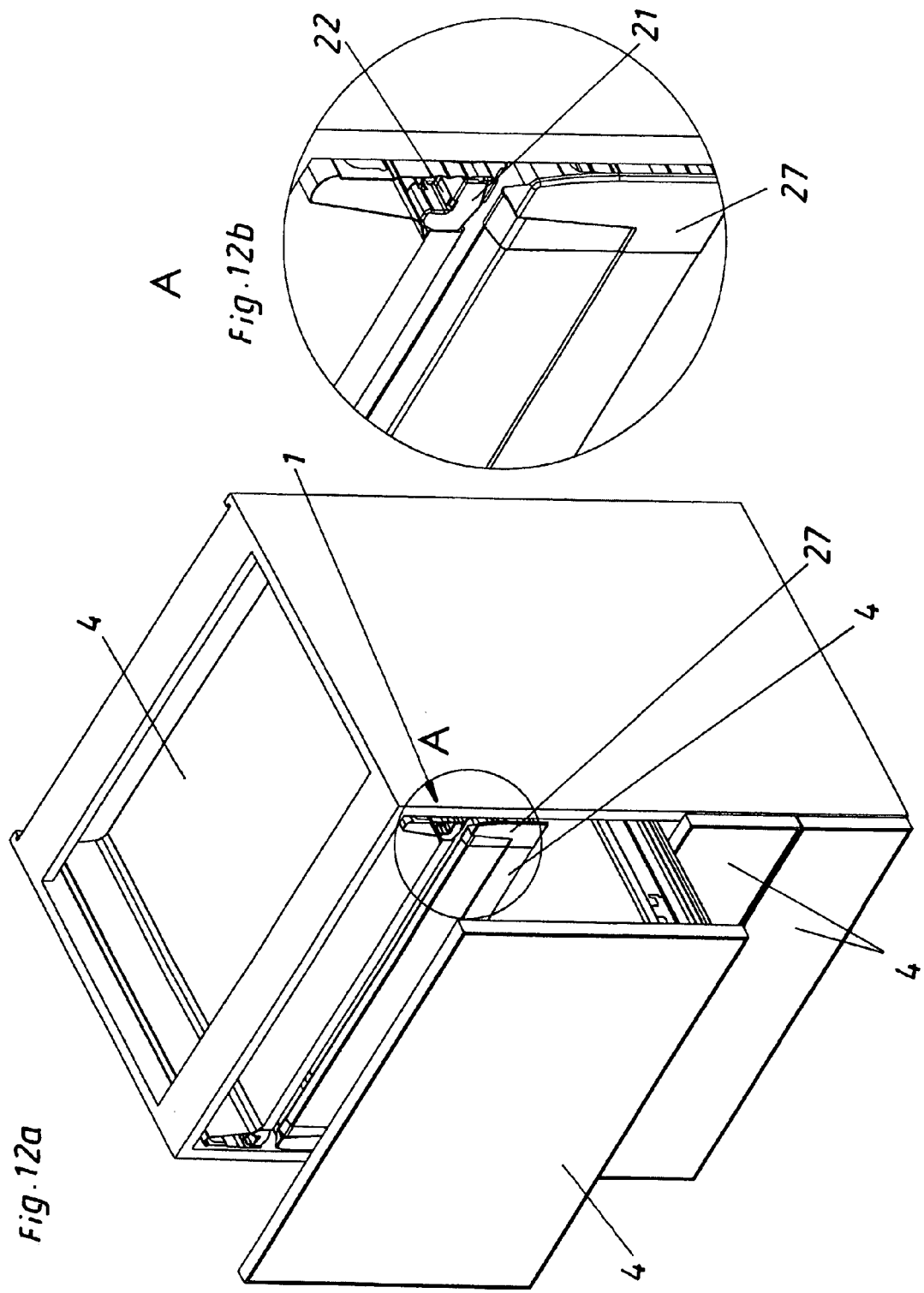

FIG. 12a shows a further example of a furniture item according to the invention which comprises several movable furniture parts 4. Three of the movable furniture parts 4 are shown as drawers. In this arrangement, the uppermost drawer covers two movable furniture parts 4 which, in turn, are represented as inner drawers. Both inner drawers have a front panel 27 (or front wall). The front panel 27 of the uppermost inner drawer has been removed so that the spring buffer 1 (as shown in FIGS. 9-11) is visible. FIG. 12b shows a detailed view of this. Once the uppermost drawer has been opened, by applying force to each front panel 27, each of the two other inner drawers can be pressed towards the rear wall of the furniture body 3, which represents a trigger signal for an ejection device 17, not shown in FIG. 12, which pushes out the inner drawer in question. Thus, the spring buffer 1 ensures that adequate play remains for the inner drawer, in the closed position shown in FIG. 12, to be pressed inwards.

Figure 13:
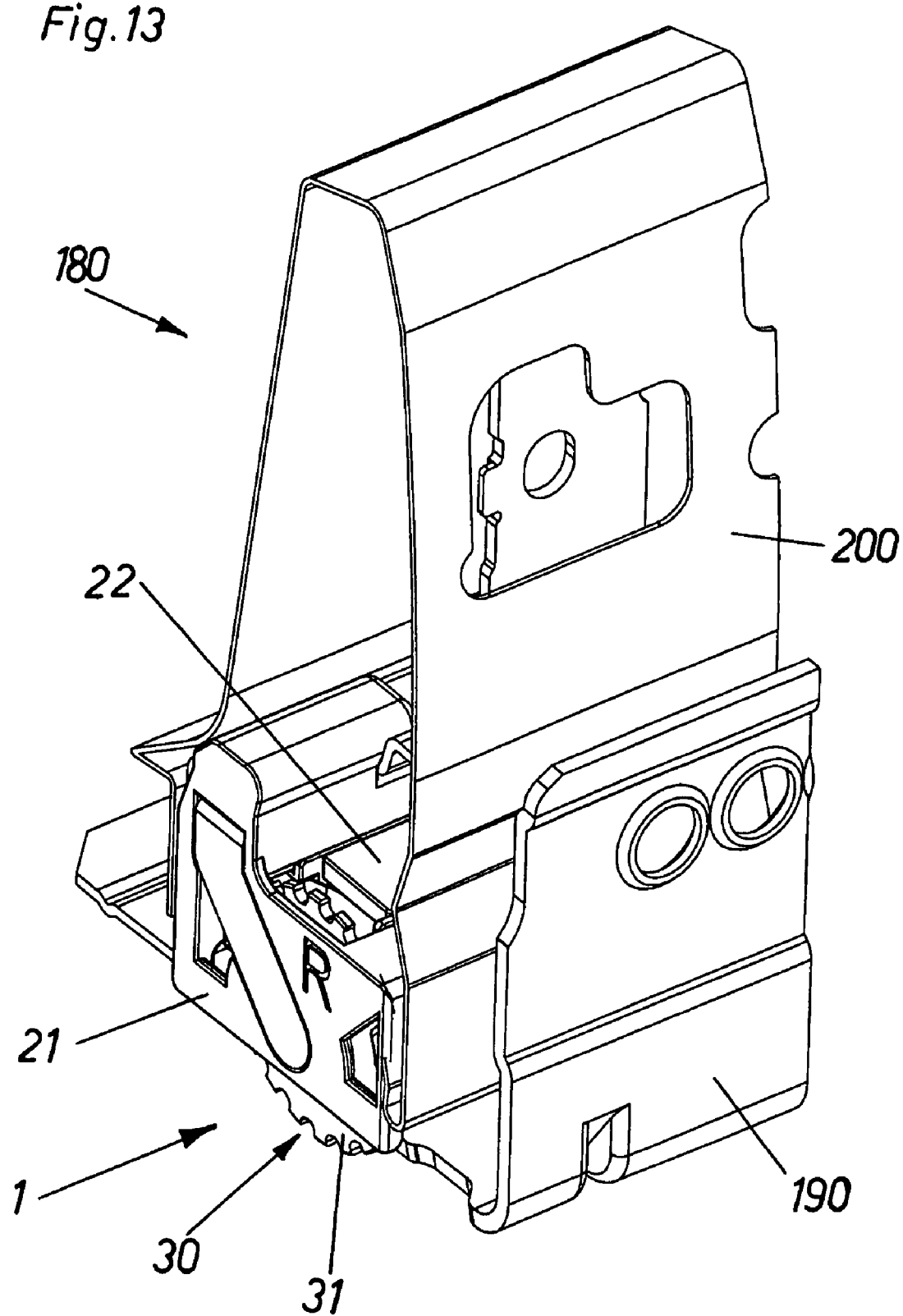

FIG. 13 shows a perspective view of the front region of a drawer guide 180 with the body rail 190 to be attached to a furniture body 3 (FIG. 7) and the drawer rail 200, movable relative to the body rail, and a further example of the spring buffer 1 shown in FIGS. 9 to 12a and 12b. The housing 21 can be seen, inserted into the front side of the hollow-chambered drawer rail 200 and firmly fixed to it. The spring buffer 1 comprises an adjusting device 30 that has an actuating element 31 in the form of an adjusting wheel which can be turned manually. Using this adjusting device 30, the relative position of the housing 21 (and thus of the drawer rail 200) can be set by moving it in relation to the slider 22 resting on the body rail 190 with the drawer in the closed position. This allows the facia of the furniture item to be optimally adjusted by turning the adjusting wheel.

Figure 14A:
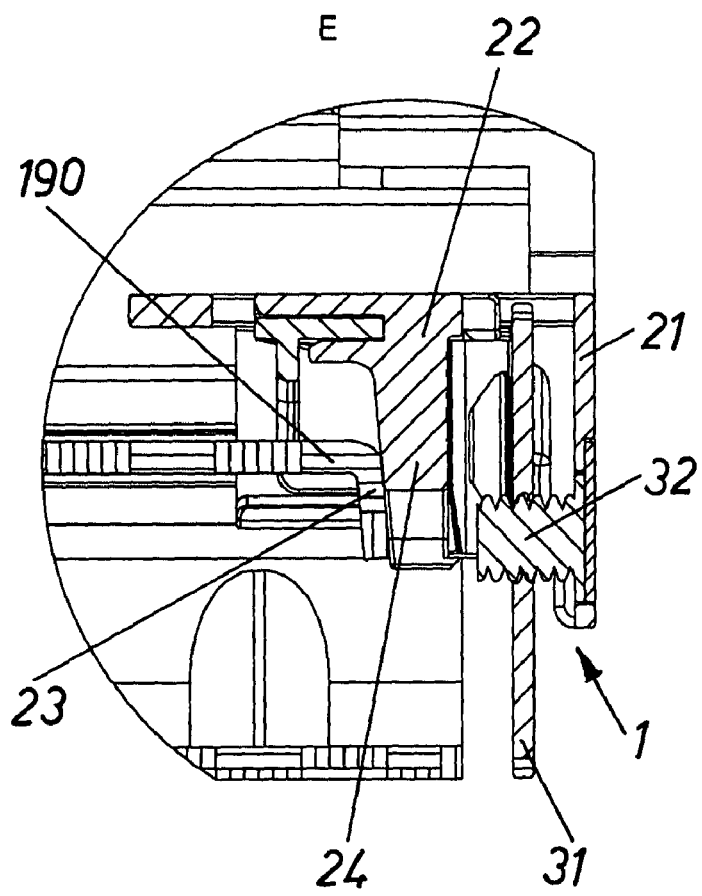
Figure 14B:
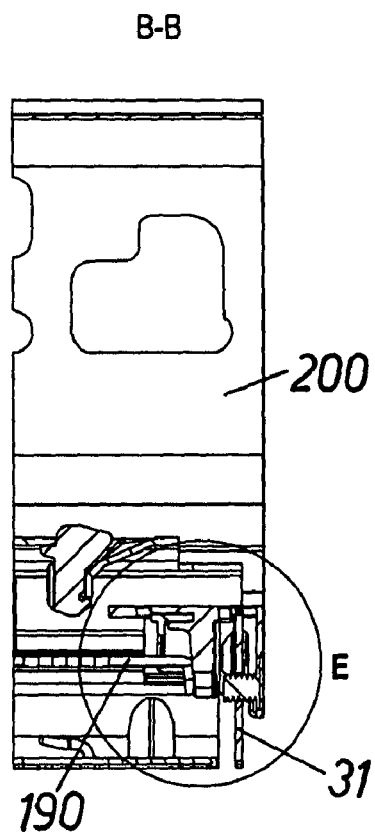
Figure 14C:
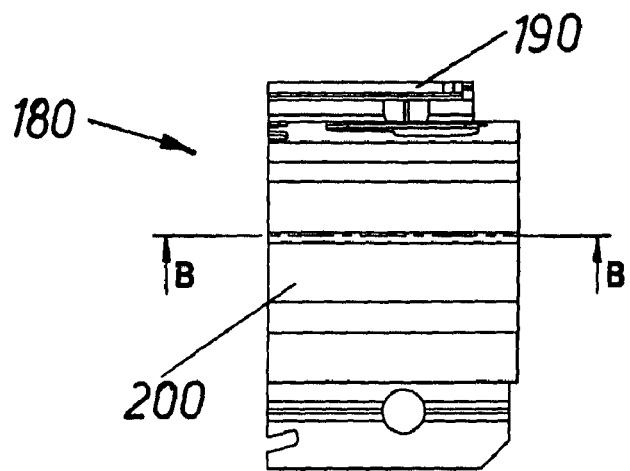

FIGS. 14a to 14c show the drawer guide 180 according to the embodiment of FIG. 13 in various views. In FIG. 14c, a top view of a part of the drawer rail 200 is shown which is mounted such that it can move relative to the body rail 190. A sectional view is presented in FIG. 14b along a line designated as B-B in FIG. 14c, thus giving a vertical section through the drawer slide 180. FIG. 14a provides an enlarged detailed view of the region circled in FIG. 14b. With the drawer, or inner drawer, in the closed position, the slide 22 with projection 24 rests on the stop 23 on the body rail 190. In the illustrated design example, the stop 23 is formed by a downward bent section of the body rail 190. Of note also is the housing 21 and a threaded bearing stud 32 which is positioned so that it can move relative to the actuating element 31. By turning the actuating element 31, which is essentially unable to move axially, the stud 32 is moved with the housing 21 relative to the slide 22. Thus, by turning the adjusting wheel, the distance between the housing 21 and the slide is adjusted, enabling the front wall or front panel of the drawer to be adjusted—particularly in a furniture arrangement as illustrated in FIGS. 12a, 12b.

Figure 15A:
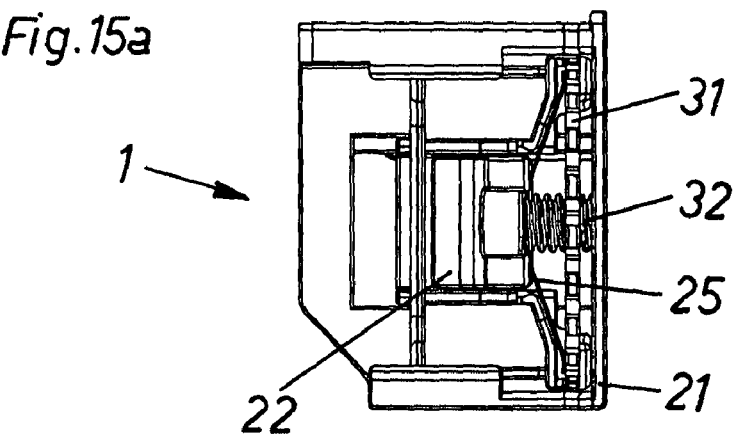
Figure 15B:
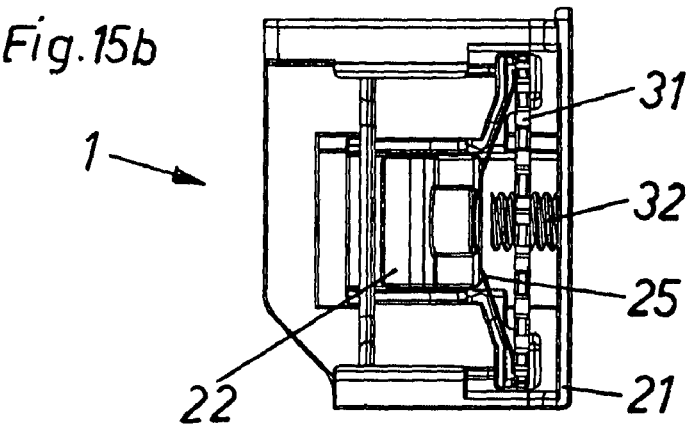
Figure 15C:
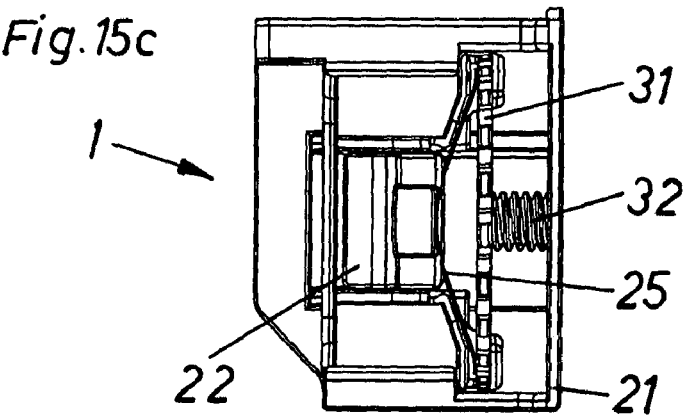

FIGS. 15a to 15c show various positions of the spring buffer 1. The spring buffer 1 comprises a housing 21 which can be incorporated into the drawer rail 200 (FIG. 13). The actuating element 31 in the form of the axially constrained adjusting wheel is positioned on the threaded bearing stud 32, whereby the relative position of the housing 21 (and, therefore, the drawer rail 200) is adjustable relative to the slide 22. FIG. 15*a* shows a slight gap between slide 22 and housing 21, FIG. 15*b* a middle position and FIG. 15*c* a wide gap between slide 22 and housing 21 brought about by turning the adjusting wheel 31.

Figure 16A:
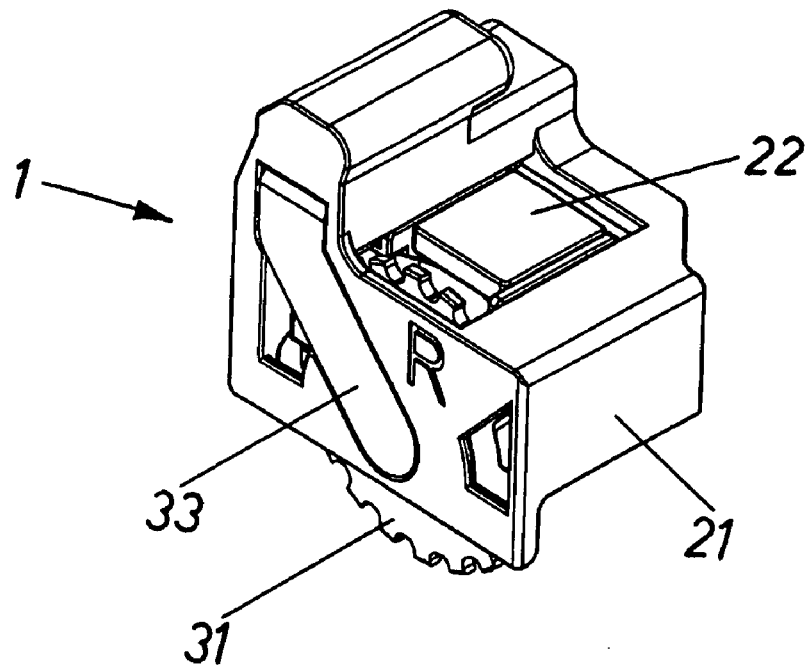
Figure 16B:
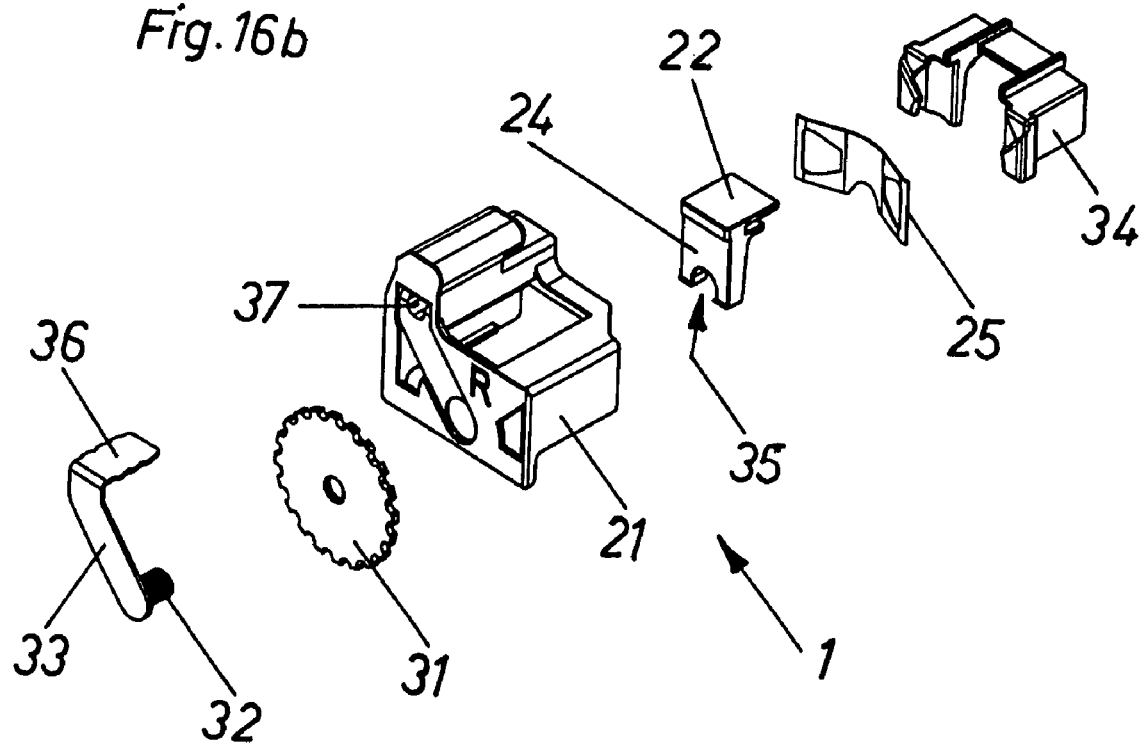

FIGS. 16*a* and FIG. 16*b* show the spring buffer 1 in an assembled state and in an exploded view, illustrating the individual parts that go into its assembly. The housing 21 retains the spring holder 34, on whose front side the curved spring 25 is inserted from below to provide the travel motion of the drawer on the ejection lever 19 shown in FIG. 7. The slide 22 is placed, during the assembly of the spring buffer 1, on the spring holder 34. The slide 22 has the projection mentioned earlier with a semicircular recess 35, whose radius is greater than the threaded bearing stud 32, so that the two parts do not collide with the spring buffer 1 in the position shown in FIG. 15*a*. Besides the bearing stud 32, the holder 33 has a ribbed flange 36 which is inserted, during assembly, into an opening 37 in the housing 21, and is thus held in place by the ribs.

Figure 17:
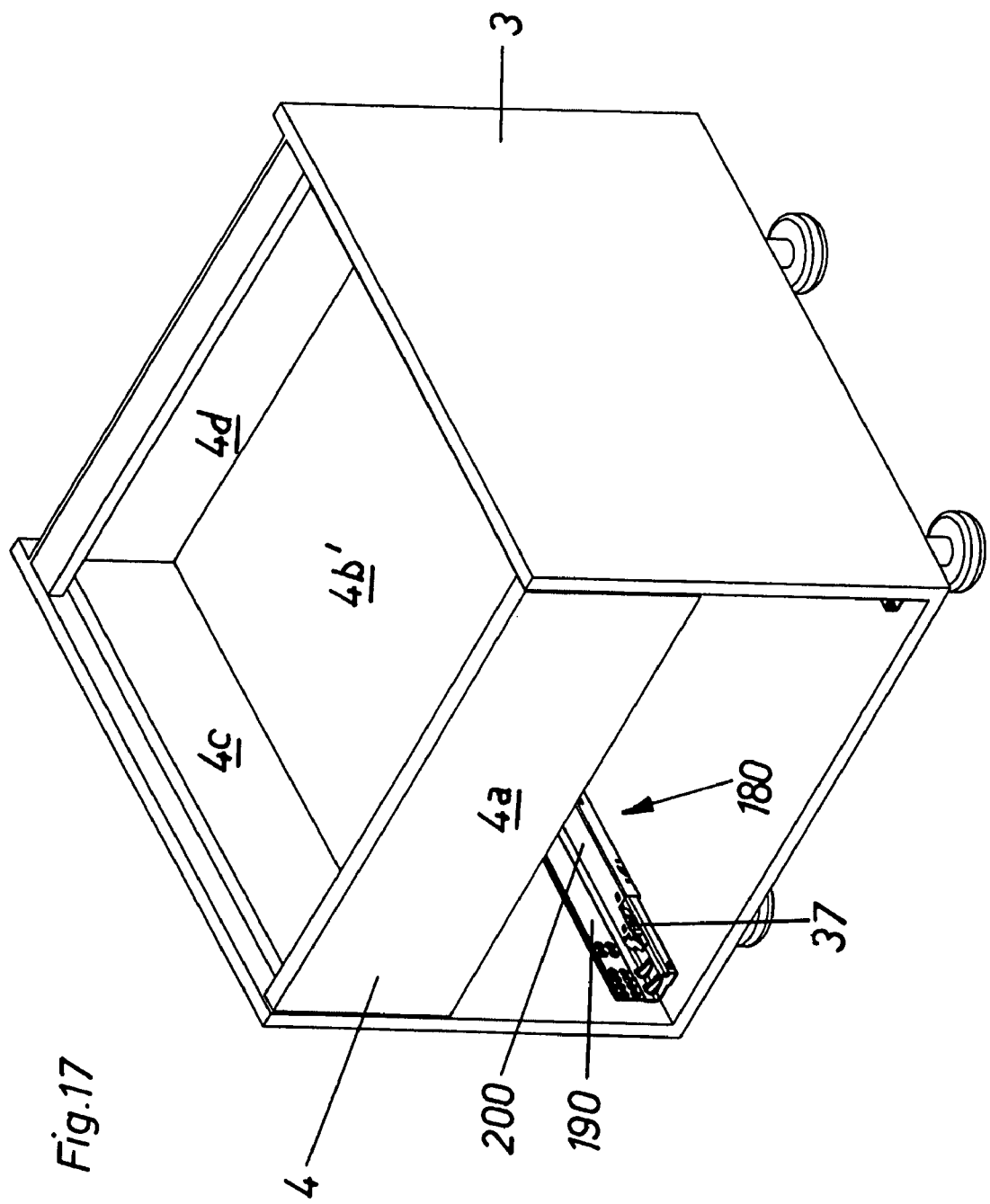

FIG. 17 shows the starting point for a further example of the invention in question. A movable furniture part 4 in the form of an inner drawer is arranged in a cabinet-shaped furniture body 3. It can be seen in this case that the front wall or panel 4*a* of the inner drawer 4 is arranged between the side walls of the furniture body 3, so that there is no provision of a stop for the front wall or panel 4*a* on the face edge of the furniture body 3. The movable furniture part 4 has a drawer base 4*b*', side pieces 4*c* and a rear piece 4*d*, which, together with the front wall or panel form an integral unit. An ejection device 17 as shown in FIG. 7 is arranged between the rear wall of the furniture body 3 and the rear side 4*d* of the movable furniture part 4 such that the ejection lever 19 operates on the touch latch principle. The furniture body 3 shown in FIG. 17 together with the drawer is in this case designed preferably as a wooden cabinet. The drawer guide 180 can also be seen which has a stationary body rail 190 and at least one drawer rail movable relative thereto. A coupling device, yet to be described, is provided to give a removable connection of the movable furniture part 4 with respect to the drawer rail 200, whereby the coupling device can be connected, and also released in or on a lateral opening 37 on the drawer rail 200, and can preferably latch. The purpose of the coupling device—as already known in the art—is to allow the movable furniture part 4 to be completely removed from the drawer guide 180 or, as the case may be, to secure it to a rail of the drawer guide assembly, but remain removable. An example of a removable connection is described in the Applicant's European patent document EP 0 421 458 61 the full contents of which are referred to within the context of this invention. According to a particular aspect of this invention, the movable furniture part 4 must be secured to the drawer guide 180, while being removable, but, at the same time, must trigger the touch latch function and, furthermore, be able to adjust the frontal surface in a beneficial manner, which are achieved by the coupling device described in this invention.

Figure 18B:
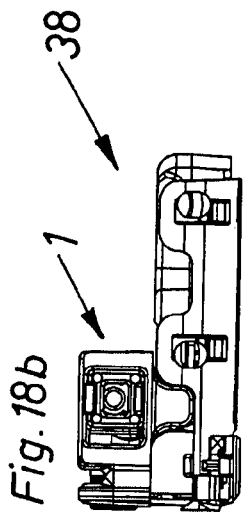
Figure 18A:
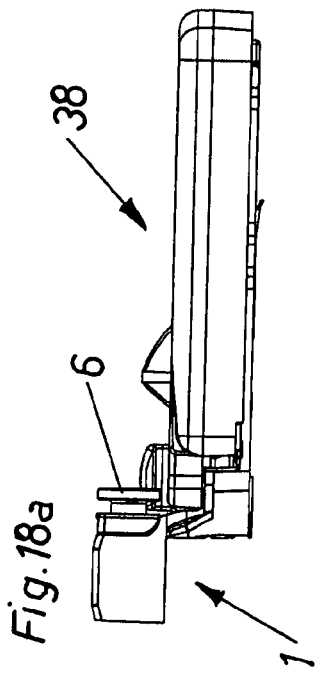
Figure 18D:
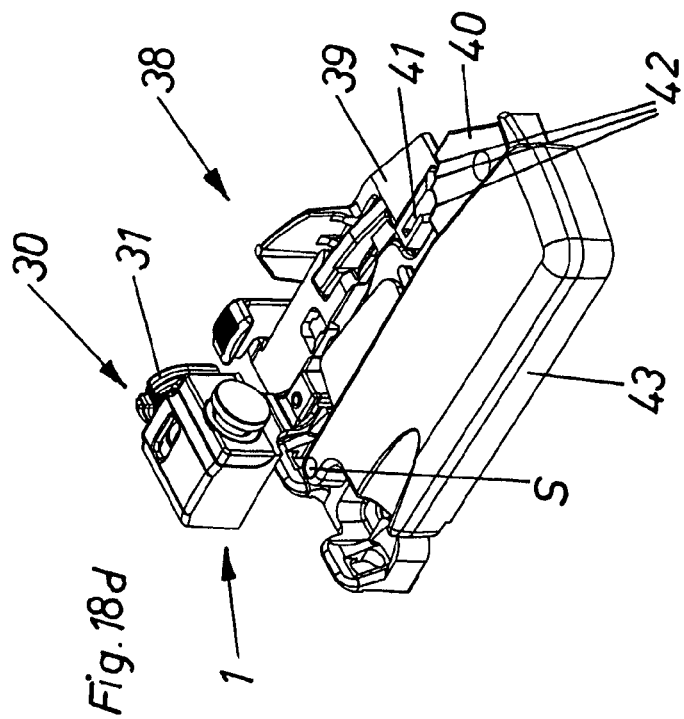
Figure 18C:
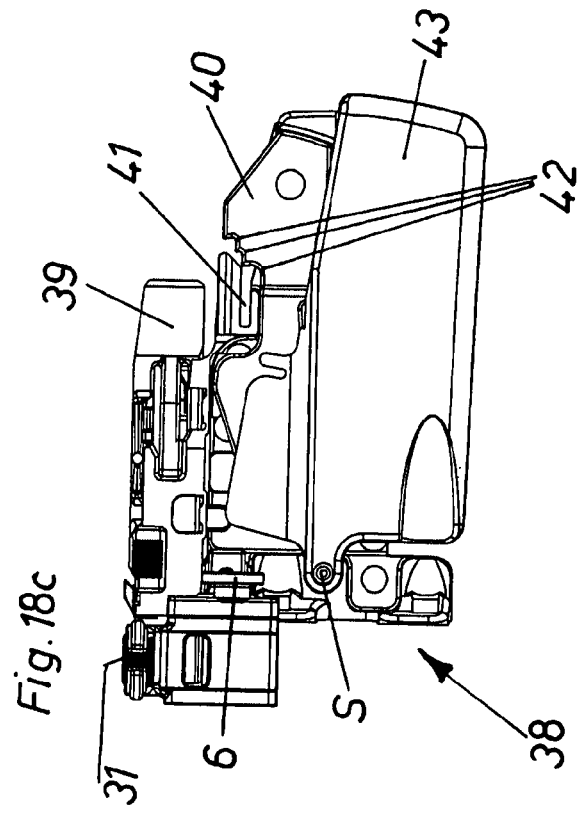

FIGS. 18*a* to FIG. 18*d* show the coupling device 38 in accordance with this invention in various views. FIG. 18*a* gives a side view, FIG. 18*b* a frontal view, FIG. 18*c* a top view and FIG. 18*d* a perspective representation thereof. As can be seen in the illustrations, the coupling device 38 has a spring buffer 1 so that these two modules form, preferably, an inseparable unit. The spring buffer 1 has a rotatable actuating element 31 which, by means of a gear, not shown here (preferably a worm gear) causes a linear motion in the buffer element 6 in the form of a rod. The coupling device 38 is attached, with its level underside, to the underside of the (wooden) base 4*b*' of the inner drawer 4 shown in FIG. 17, as well as being lateral on the front end. When the inner drawer 4 is fitted and in its closed position, the stop of buffer element 6 rests preferably on the front face of the body rail 190, or alternatively on a stationary piece of the furniture body. As a result of the spring mounting of the buffer element 6, the inner drawer 4 in its closed position can be moved towards the rear wall of the furniture body 3, so that the touch latch function can be triggered. Using the adjusting wheel 31, on the one hand, the distance of the travel of the buffer element 6 can be adjusted, while, on the other hand, the adjusting device 30 allows the frontal surfaces of each of the inner drawers to be adjusted so that they are level. The coupling device 38 has an axially movable stud 39 which, in the assembled state, engages with the front end of the drawer rail 200 and which, preferably, can be inserted into the front face of the drawer rail 200.

Furthermore, the coupling device 38 has a spring-loaded latch piece 40 (or one on which a spring is actable thereupon) with the drawer fitted in position, will engage with the lateral opening 37 in the drawer rail 200. Thus, with the drawer fitted, the front face of the drawer rail 200 is pushed on to the stud 39 and guided into the gap 41, whereupon the impact surfaces 42 staggered one after the other relative to the sliding direction of the drawer, are latched into the opening (FIG. 17), resulting in progressive latching, the further the drawer is pushed, gradually reducing the play between the drawer and the drawer rail 200. The greater the number of incremental impact surfaces 42, the more precisely the drawer can be latched to the drawer rail 200. It should be mentioned in this connection that the impact surfaces 42 can be offset to the sliding direction of the drawer and, in fact, offset to any possible direction three dimensionally.

If the drawer has to be removed from the drawer rail 200, the swivel arm 43, rotating around axis S, is forced against spring pressure towards the drawer rail 200, whereupon the latch piece 40 with its impact surfaces 42 is moved out of the opening 37 and the drawer can be removed completely from the drawer slide 180.

Figure 19A:
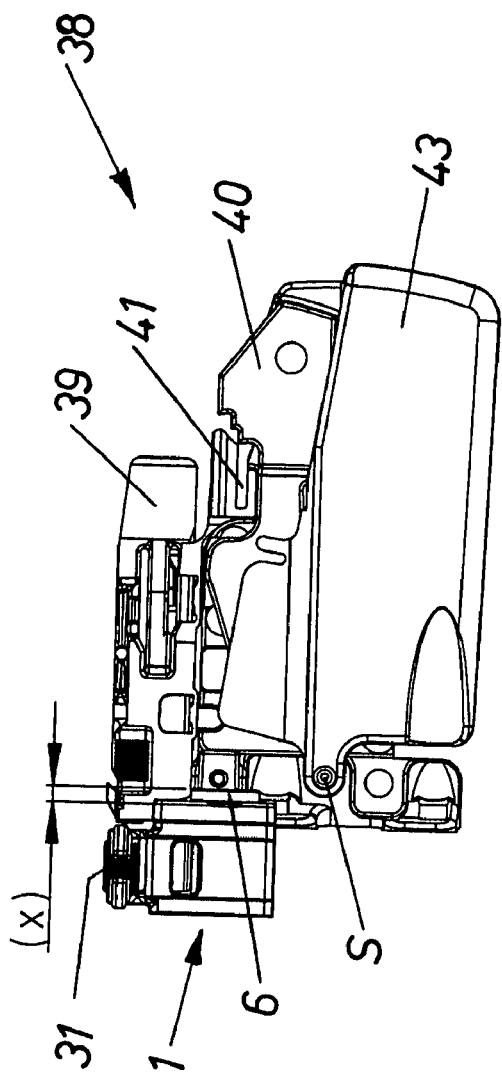
Figure 19B:
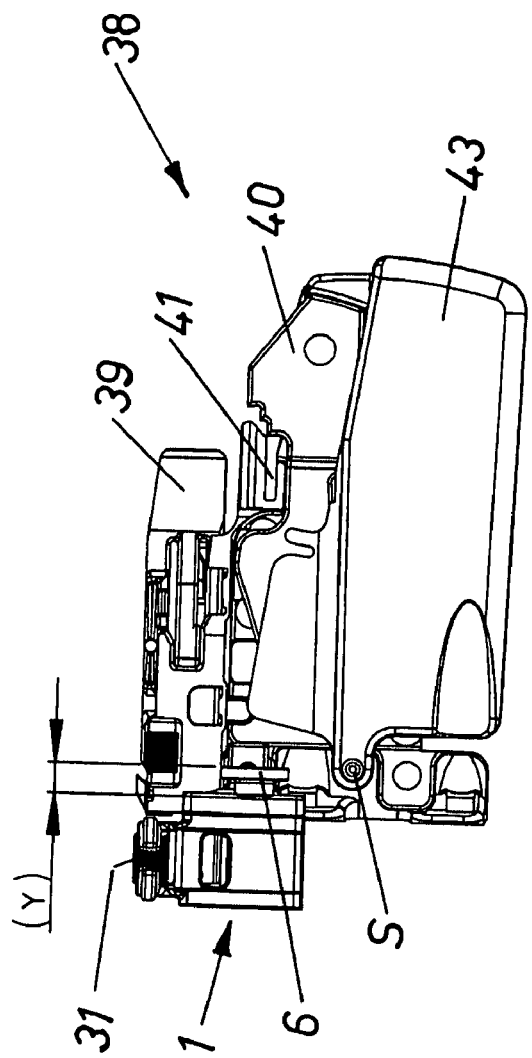

FIGS. 19*a* and FIG. 19*b* each show a view from above of the coupling device 38 comprising the spring buffer 1. In FIG. 19*a*, the buffer element 6 has essentially compressed completely while FIG. 19*b* shows the position where the stop of buffer element 6 has extended outwards. By turning the actuating element 31, the position of the buffer element 6 can be freely selected within predetermined limits. The buffer element 6 is seen in the different positions X and Y.

Figure 20B:
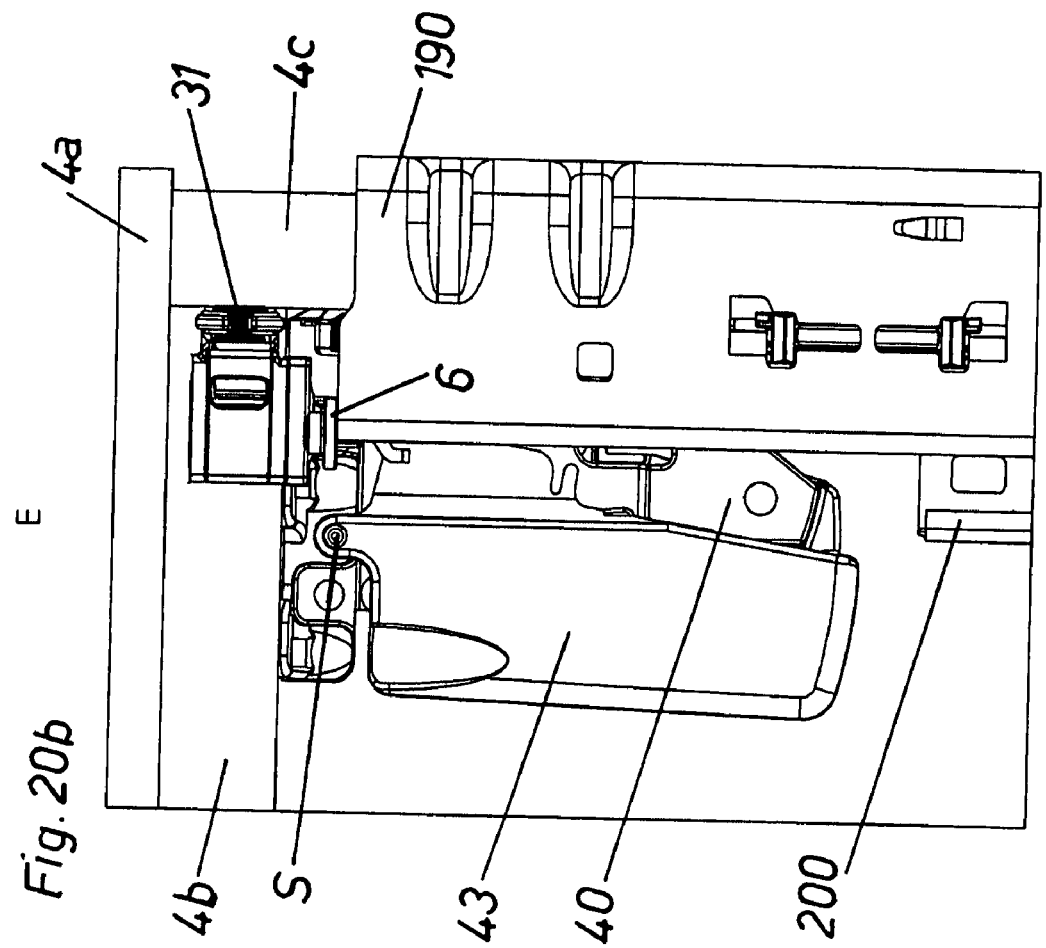
Figure 20A:
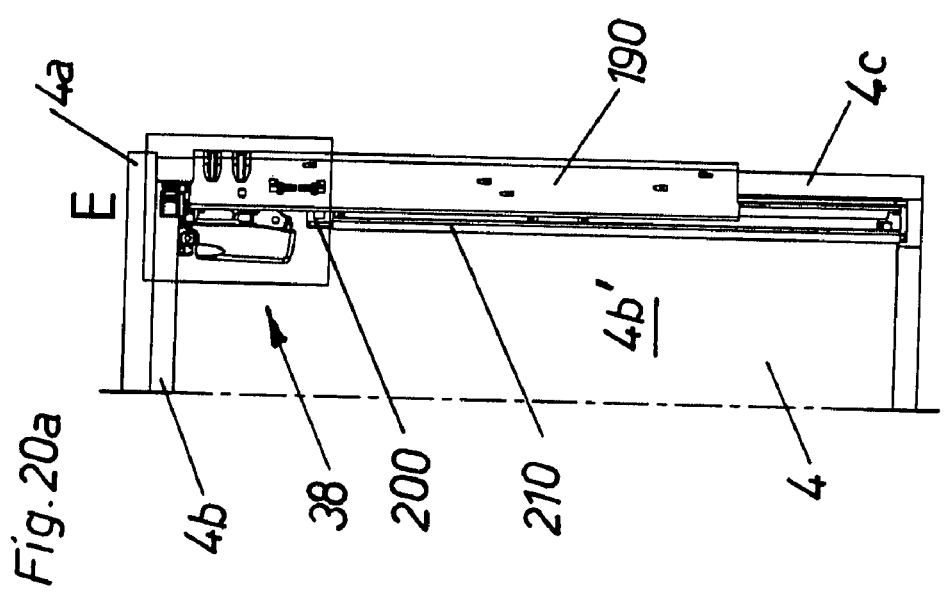

FIGS. 20*a* and FIG. 20*b* show a view from under the base 4*b*' of the inner drawer corresponding to the furniture arrangement in FIG. 17. The view includes the front panel 4*a* against which is the front piece 4*b*, as well as a side piece 4*c* and the drawer base 4*b*'. To make the view clearer, the furniture body 3 has been omitted. Also included in the view are a body rail 190 to be attached to the furniture body 3, a middle rail 210 travelling in a differential manner relative thereto and a drawer rail 200, also travelling differentially, to which the movable furniture part 4, in the form of an inner drawer, is attached, but releasable, by means of the coupling device 38. FIG. 20*b* shows in more detail in an enlarged view of the rectangular region indicated in FIG. 20*a*. Of particular note is the buffer element 6 of the spring buffer 1 which, with the inner drawer closed, abuts the front face of the body rail 190. It is possible move the buffer element 6 by using the actuating element 31 which projects downwards from the drawer base 4*b*', making access easy. The view also shows the latched position of the latch piece 40 on the drawer rail 200. This latch action can be released by pressing on the swivel arm 43, which rotates around the S axis, causing movement of the latch piece 40 in the counter direction and out of the opening 37 in the drawer rail 200 shown in FIG. 17. The actuating element 31 can be in the form of an adjusting wheel, which is turned manually, or can have a recess to accept a tool.

It should be pointed out that the coupling device with the spring buffer described in the attached drawings is purely an example serving to explain the invention. The person skilled in the art is able to apply beneficially all of the known embodiments of such coupling devices.

The present invention is not restricted to the embodiments shown, but rather extends to all variants and technical equivalents which can fall within the scope of the attached claims. Also, the positional details chosen in the description, such as over, under, lateral, etc., refer to the usual mounting position of the used devices or refer to the figures as shown and should be transferred—in the case of a change of position—analogously to the new position.

The invention claimed is:

1. A spring buffer for a furniture item having a furniture body and a movable furniture part movable with respect to the furniture body, said spring buffer comprising:
   a pot configured to be inserted into one of the furniture body or the movable furniture part;
   a sleeve mounted within said pot such that a position of said sleeve is adjustable relative to said pot, said sleeve having a recess on an outer surface into which an adjusting element can be inserted for adjusting a position of said sleeve relative to said pot, no portion of said sleeve having an outer diameter greater than a largest inside diameter of said pot;
   a buffer element configured to be arranged between the movable furniture part and the furniture body such that the movable furniture part in a closed position can be moved against a force of said buffer element towards the furniture body, said buffer element being adjustably supported within said sleeve; and
   a spring acting upon said buffer element so as to generate said force, said spring being arranged between a bottom of said pot and said buffer element;
   wherein a position of said buffer element is adjustable so as to thereby adjust a maximum length of said spring.

2. The spring buffer according to claim 1, wherein each of said sleeve and said pot has threads such that a position of said sleeve in said pot can be changed by turning said sleeve.

3. The spring buffer according to claim 1, wherein said buffer element is adjustably positioned within said sleeve such that a maximum amount of projection of said buffer element from said pot is adjustable.

4. The spring buffer according to claim 1, wherein a position of said sleeve is adjustable relative to said pot such that a maximum amount of projection of said buffer element from said pot is adjustable.

5. The spring buffer according to claim 4, wherein said sleeve is threaded into said pot.

6. A furniture item comprising:
   a furniture body;
   a movable furniture part movable with respect to said furniture body;
   an ejection device for moving said movable furniture part from a closed position to an open position, said ejection device being activated by pushing said movable furniture part an activating distance in a non-opening direction from the closed position toward an activating position; and
   a spring buffer arranged to maintain the activating distance between said movable furniture part and said furniture body when said movable furniture part is in the closed position, said spring buffer including:
      a buffer element arranged between said movable furniture part and said furniture body such that said movable furniture part in a closed position can be moved against a force of said buffer element towards said furniture body;
      a spring acting upon said buffer element so as to generate said force;
      a pot inserted into one of said furniture body or said movable furniture part; and
      a sleeve threaded into said pot so that a position of said sleeve is adjustable relative to said pot such that a maximum amount of projection of said buffer element from said pot is adjustable, said buffer element being supported within said sleeve, said spring being arranged between a bottom of said pot and said buffer element;
      wherein said pot has an internal screw thread extending substantially an entire length of said pot, an external screw thread of said sleeve engaging said internal screw thread of said pot so as to thread said sleeve into said pot;
      wherein a position of said buffer element is adjustable so as to thereby adjust a maximum length of said spring.

7. The furniture item according to claim 6, wherein said spring buffer is arranged within a hole in one of said furniture body or said movable furniture part.

8. The furniture item according to claim 7, wherein said movable furniture part is a drawer and said spring buffer is arranged on said furniture body such that said drawer rests with a front panel of said drawer on said spring buffer when said drawer is in the closed position.

9. The furniture item according to claim 7, wherein said movable furniture part is a furniture door and said spring buffer is arranged on said furniture body such that said door rests with a panel of said door on said spring buffer when said door is in the closed position.

10. The furniture item according to claim 6, wherein said sleeve has a recess into which an adjusting element can be inserted for adjusting a position of said sleeve relative to said pot.

11. The furniture item according to claim 6, wherein an entire length of said sleeve has an average outer diameter no greater than an average inner diameter of said pot.

12. A spring buffer for a furniture item having a furniture body and a movable furniture part movable with respect to the furniture body, said spring buffer comprising:
   a pot to be inserted into one of the furniture body or the movable furniture part, said pot having an internal screw thread extending substantially an entire length of said pot;
   a sleeve having an external screw thread engaging said internal screw thread of said pot to thread said sleeve into said pot such that a position of said sleeve is adjustable relative to said pot;
   a buffer element to be arranged between the movable furniture part and the furniture body such that the movable furniture part in a closed position can be moved against a force of said buffer element towards the furniture body, said buffer element being adjustably supported within said sleeve; and
   a spring acting upon said buffer element so as to generate said force, said spring being arranged between a bottom of said pot and said buffer element;

wherein a position of said buffer element is adjustable so as to thereby adjust a maximum length of said spring.

13. A spring buffer for a furniture item having a furniture body and a movable furniture part movable with respect to the furniture body, said spring buffer comprising:
- a pot to be inserted into one of the furniture body or the movable furniture part;
- a sleeve mounted within said pot such that a position of said sleeve is adjustable relative to said pot, said sleeve having a slot on an outer surface for receiving an adjusting device to adjust a position of said sleeve relative to said pot;
- a buffer element arranged between the movable furniture part and the furniture body such that the movable furniture part in a closed position can be moved against a force of said buffer element towards the furniture body, said buffer element being supported within said sleeve; and
- a spring acting upon said buffer element so as to generate said force, said spring being arranged between a bottom of said pot and said buffer element;
- wherein a position of said buffer element is adjustable so as to thereby adjust a maximum length of said spring, and no portion of said sleeve having an outer diameter greater than a largest inside diameter of said pot.

* * * * *